US010588171B2

(12) United States Patent
Ang et al.

(10) Patent No.: US 10,588,171 B2
(45) Date of Patent: Mar. 10, 2020

(54) TECHNIQUES FOR MULTI-STATE DRX IN NEW RADIO

(71) Applicant: QUALCOMM Incorporated, San Diego, CA (US)

(72) Inventors: Peter Pui Lok Ang, San Diego, CA (US); Brian Clarke Banister, San Diego, CA (US); Tingfang Ji, San Diego, CA (US); Alexei Yurievitch Gorokhov, San Diego, CA (US); Wanshi Chen, San Diego, CA (US); Jing Sun, San Diego, CA (US); Joseph Binamira Soriaga, San Diego, CA (US); Jafar Mohseni, San Diego, CA (US); Amir Aminzadeh Gohari, Sunnyvale, CA (US); John Edward Smee, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/974,049

(22) Filed: May 8, 2018

(65) Prior Publication Data

US 2018/0332655 A1 Nov. 15, 2018

Related U.S. Application Data

(60) Provisional application No. 62/505,473, filed on May 12, 2017.

(51) Int. Cl.
*H04W 76/28* (2018.01)
*H04W 52/02* (2009.01)
(Continued)

(52) U.S. Cl.
CPC ....... *H04W 76/28* (2018.02); *H04W 52/0216* (2013.01); *H04W 52/0229* (2013.01);
(Continued)

(58) Field of Classification Search
None
See application file for complete search history.

(56) References Cited

U.S. PATENT DOCUMENTS

| 2013/0035082 | A1* | 2/2013 | Sen | H04W 4/18 455/414.4 |
| 2016/0345267 | A1* | 11/2016 | Diachina | H04W 52/0235 |

(Continued)

OTHER PUBLICATIONS

U.S. Appl. No. 62/475,683, filed Mar. 23, 2017 by Kim (Year: 2017).*

(Continued)

*Primary Examiner* — Kodzovi Acolatse
*Assistant Examiner* — Jay L Vogel
(74) *Attorney, Agent, or Firm* — Arent Fox LLP

(57) ABSTRACT

The present disclosure describes various examples of a method, an apparatus, and a computer readable medium for multi-state discontinuous reception (DRX) in wireless communications. For example, one of the methods described may include identifying, by a user equipment (UE), at least two states in connected mode, determining, by the UE, one or more triggers for transitioning between the at least two states, and transitioning, by the UE, from a first state of the at least two states to a second state of the at least two states in response to a determination of the one or more triggers. In an aspect, the transitioning comprises transitioning between cross-slot scheduling and same-slot scheduling, or between a narrow bandwidth and a wide bandwidth, or between a larger periodicity and a smaller periodicity for monitoring.

33 Claims, 16 Drawing Sheets

(51) Int. Cl.
H04W 76/27 (2018.01)
H04W 72/12 (2009.01)
(52) U.S. Cl.
CPC .... *H04W 52/0232* (2013.01); *H04W 72/1205* (2013.01); *H04W 76/27* (2018.02)

(56) References Cited

U.S. PATENT DOCUMENTS

| | | | |
|---|---|---|---|
| 2018/0092070 A1* | 3/2018 | Liao | H04L 1/0038 |
| 2018/0279223 A1* | 9/2018 | Kim | H04W 72/042 |
| 2018/0279284 A1* | 9/2018 | Wang | H04W 72/044 |

OTHER PUBLICATIONS

U.S. Appl. No. 62/475,862, filed Mar. 24, 2017 by Wang (Year: 2017).*
International Search Report and Written Opinion—PCT/US2018/031859—ISA/EPO—dated Jul. 26, 2018.
Qualcomm Incorporated: "Evaluation of Frame Structure Design for UE Power", 3GPP Draft; R1-1610135_Evaluation_of_Frame_Structure_Design_For_UE_Power, 3rd Generation Partnership Project (3GPP), Mobile Competence Centre; 650, Route Des Lucioles; F-06921 Sophia-Antipolis Cedex, vol. RAN WG1, no. Lisbon, Portugal; Oct. 10, 2016-Oct. 14, 2016, Oct. 9, 2016 (Oct. 9, 2016), pp. 1-7, XP051150158, Retrieved from the Internet: URL: http://www.3gpp.org/ftp/Meetings_3GPP_SYNC/RAN1/Docs/ [retrieved on Oct. 9, 2016].
Qualcomm Incorporated: "UE Power Saving during Active State", 3GPP Draft; R21709117 UE Power Saving During Active State, 3rd Generation Partnership-Project (3GPP), Mobile Competence Centre; 650 Route Des Lucioles; F-06921 Sophia-Antipolis Cedex; France, vol. Ran WG2, no. Berlin, Germany; Aug. 21, 2017-Aug. 25, 2017, Aug. 20, 2017 (Aug. 20, 2017), pp. 16, XP051318910, Retrieved from the Internet: URL:http://www.3gpp.org/ftp/Meetings_3GPP_SYNC/RAN2/Docs/ [retrieved on Aug. 20, 2017].
Qualcomm Incorporated: "Summary of [86-19] Discussion on Slot Structure Use Cases", 3GPP Draft; R1-1610129 Summary of 86-19 Time Domain Structure Use Case, 3rd Generation Partnership Project (3GPP), Mobile Competence Centre; 650, Route Des Lucioles; F-06921 Sophia-Antipolis Cedex; vol. RAN WG1, no. Lisbon, Portugal; Oct. 10, 2016-Oct. 14, 2016, Oct. 9, 2016 (Oct. 9, 2016), pp. 1-21, XP051150152, Retrieved from the Internet: URL: http://www.3gpp.org/ftp/Meetings_3GPP_SYNC/RAN1/Docs/ [retrieved on Oct. 9, 2016).
Qualcomm Incorporated: "WF on Evaluation for Wake-Up Signal", 3GPP Draft; R1-1700821_WUS, 3rd Generation Partnership Project (3GPP), Mobile Competence Centre; 650, Route Des Lucioles; F-06921 Sophia-Antipolis Cedex; France, vol. RAN WG1, no. Spokane, U.S.A; Jan. 16, 2017-Jan. 20, 2017, Jan. 10, 2017 (Jan. 10, 2017), pp. 1-3, XP051203134, Retrieved from the Internet: URL: http://www.3gpp.org/ftp/tsg_ran/WG1_RL1/TSGR1_AH/NR_AH_1701/Docs/ [retrieved on Jan. 10, 2017].

* cited by examiner

TECHNIQUES FOR MULTI-STATE DRX IN NEW RADIO

CROSS-REFERENCE TO RELATED APPLICATION

This application claims the benefit of U.S. Provisional Application Ser. No. 62/505,473, entitled "TECHNIQUES FOR MULTI-STATE DRX IN NEW RADIO" and filed on May 12, 2017, which is expressly incorporated by reference herein in its entirety.

BACKGROUND

The present disclosure relates generally to wireless communication systems, and more particularly, to techniques for multi-state discontinuous reception (DRX) (e.g., connected mode DRX or C-DRX) in wireless communications (e.g., 5th Generation New Radio or 5G NR).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE) or LTE-Advanced (LTE-A). However, although newer multiple access systems, such as an LTE or LTE-A system, deliver faster data throughput than older technologies, such increased downlink rates have triggered a greater demand for higher-bandwidth content, such as high-resolution graphics and video, for use on or with mobile devices. As such, demand for bandwidth, higher data rates, better transmission quality as well as better spectrum utilization, and lower latency on wireless communication systems continues to increase.

The 5th Generation (5G) New Radio (NR) communications technology, used in a wide range of spectrum, is envisaged to expand and support diverse usage scenarios and applications with respect to current mobile network generations. In an aspect, 5G NR communications technology includes, for example: enhanced mobile broadband (eMBB) addressing human-centric use cases for access to multimedia content, services and data; ultra-reliable low-latency communications (URLLC) with strict requirements, especially in terms of latency and reliability; and massive machine type communications (mMTC) for a very large number of connected devices and typically transmitting a relatively low volume of non-delay-sensitive information. As the demand for mobile broadband access continues to increase, there exists a need for further improvements in 5G communications technology and beyond. Preferably, these improvements should be applicable to other multi-access technologies and the telecommunication standards that employ these technologies.

Accordingly, due to the requirements for increased data rates, higher capacity, and lower latency, new approaches may be desirable to improve the system reliability and energy efficiency by using enhanced DRX (e.g., multi-state C-DRX) schemes and techniques, in order to enhance medium access and/or scheduling, satisfy consumer demand, and improve user experience in wireless communications, e.g., 5G NR communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method related to multi-state discontinuous reception (DRX) is provided as part of this disclosure. According to one example, the method may include identifying, by a user equipment (UE), at least two states in connected mode, determining, by the UE, one or more triggers for transitioning between the at least two states, and transitioning, by the UE, from a first state of the at least two states to a second state of the at least two states in response to a determination of the one or more triggers. In an aspect, the transitioning comprises transitioning between cross-slot scheduling and same-slot scheduling, or between a narrow bandwidth and a wide bandwidth, or between a larger periodicity and a smaller periodicity for monitoring.

In an aspect of the disclosure, an apparatus for multi-state DRX in wireless communications is provided. The apparatus may include a memory configured to store instructions, and at least one processor communicatively coupled with the memory. In an example, the at least one processor is configured to execute the instructions to identify at least two states in connected mode, determine one or more triggers for transitioning between the at least two states, and transition from a first state of the at least two states to a second state of the at least two states in response to a determination of the one or more triggers. In some examples, the transitioning comprises transitioning between cross-slot scheduling and same-slot scheduling, or between a narrow bandwidth and a wide bandwidth, or between a larger periodicity and a smaller periodicity for monitoring.

In yet another aspect, an apparatus for multi-state DRX in wireless communications is provided that includes means for performing the operations of methods described herein. For example, the apparatus may include means for identifying at least two states in connected mode, means for determining one or more triggers for transitioning between the at least two states, and means for transitioning from a first state of the at least two states to a second state of the at least two states in response to a determination of the one or more triggers. In some examples, the means for transitioning comprises means for transitioning between cross-slot scheduling and same-slot scheduling, or between a narrow bandwidth and a wide bandwidth, or between a larger periodicity and a smaller periodicity for monitoring.

In a further aspect, a computer-readable medium (e.g., a non-transitory computer-readable storage medium) is provided including code executable by one or more processors to perform the operations of methods described herein. For example, a computer-readable medium storing computer code executable by a processor for multi-state DRX in wireless communications is provided. The computer-readable medium may include code for identifying at least two states in connected mode, code for determining one or more triggers for transitioning between the at least two states, and code for transitioning from a first state of the at least two states to a second state of the at least two states in response to a determination of the one or more triggers. In some examples, the code for transitioning comprises code for transitioning between cross-slot scheduling and same-slot scheduling, or between a narrow bandwidth and a wide bandwidth, or between a larger periodicity and a smaller periodicity for monitoring.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings are presented to aid in the description of various aspects of the disclosure and are provided solely for illustration of the aspects and not limitation thereof. The drawings include like reference numbers for like elements, and may represent optional components or actions using dashed lines.

DETAILED DESCRIPTION

Figure 1:
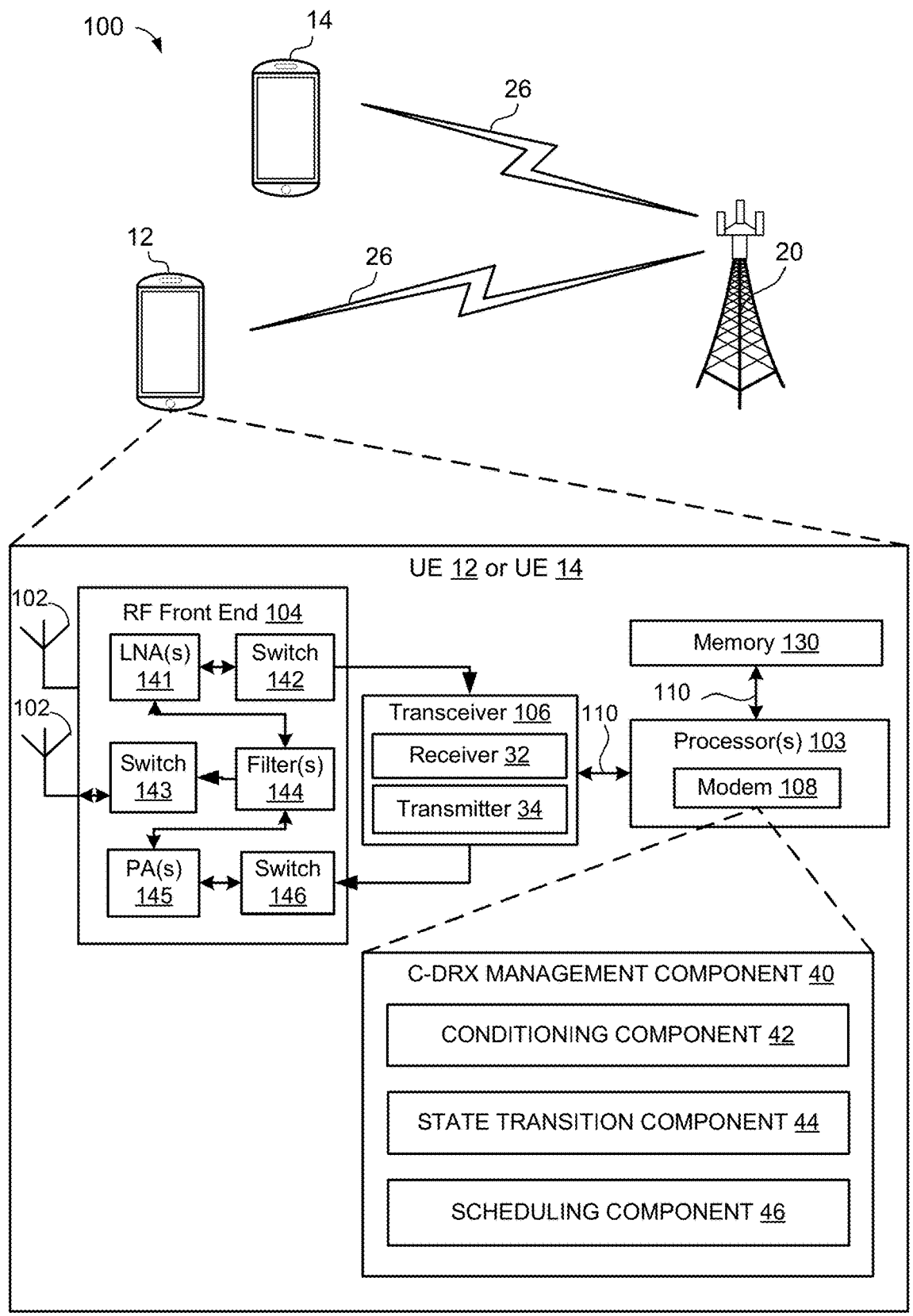
FIG. 1 is a diagram illustrating an example of a wireless communications system (e.g., a 5G NR system) including a base station and one or more user equipments (UEs) for multi-state discontinuous reception (DRX) operations, in accordance with various aspects of the present disclosure.

In a conventional wireless communications system (e.g., an LTE system), connected mode discontinuous reception (C-DRX) may support two states from a user equipment (UE) functionality perspective. In some examples, across time, a UE may be configured to operate in a sleep mode (e.g., a DRX state) or an active mode/state (e.g., a mode/state with either an ON duration or an inactivity timer being not expired). In an aspect, during the active mode/state, the UE may be configured to support full functionality of the UE. In some implementations, coarse granularity of states may lead to some simplicity in scheduler design at the expense of sacrificing some UE power. On the other hand, to allow better tradeoff between power consumption and latency, finer granularity of DRX states may be used or applied to improve UE power efficiency. As such, enhanced DRX schemes and techniques with finer granularity of DRX states may be desirable to improve the system reliability and/or to enhance system energy efficiency by using multi-state (e.g., two or more states) C-DRX in wireless communications (e.g., 5G NR).

In some aspects related to 5G NR communications, multiple DRX states are proposed to enhance the DRX operations and save power. For example, in an aspect, several states (e.g., a physical downlink control channel (PDCCH) monitoring state) may be used for low percentage of data being scheduled for transmission or reception. In another aspect, data ready state may be used for high percentage of data being scheduled for transmission or reception. In an aspect, a wake-up signaling (WUS) pre-wake-up state may be used to allow skipping of the ON duration(s) of a DRX cycle.

In some aspects related to intuition for efficiency gain, for example, in a relatively short DRX cycle, the inactivity timer may be short. Depending on the traffic pattern, significant percentage of the DRX cycle may be empty. A WUS pre-wake-up state may be used and reap most of the potential power saving. In a relatively long DRX cycle, the inactivity timer may be long. In this case, a PDCCH monitoring state and/or a WUS monitoring state may be used to allow potential grant monitoring at a lower power level, comparing with using a data ready state.

In some aspects, a state may comprise a respective configuration for connected mode operation (e.g., C-DRX). In some examples, the configuration may be at least one of cross-slot scheduling, same-slot scheduling, an adaptive bandwidth for signal reception (e.g., using bandwidth parts), low power setting, or high power setting. In some cases, transitioning from one state to another state may comprise dynamically transitioning from one configuration to another configuration for C-DRX operations. The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In a conventional wireless communication system (e.g., an LTE system), DRX (e.g., C-DRX) may support two states from UE functionality perspective. In some implementations, a UE may be in DRX (or a sleep mode) or Active (either ON duration or inactivity timer unexpired) state/mode. During the Active state, the UE may be required to support full functionality. For example, the UE may support PDCCH decoding, and upon decoding a downlink (DL) grant in a subframe (or a transmission time interval (TTI)), the UE may receive data in the same subframe. In an aspect, the UE may support transmission of hybrid automatic repeat request (HARQ) feedback(s). In an example, when there is no grant in a subframe, the UE may perform micro-sleep for the rest of the subframe. However, in an aspect, due to PDCCH decoding latency, the duration of micro-sleep may be short and extent of power saving may be limited.

In an aspect, during the Active state, receiving bandwidth of the UE may be across the full or entire bandwidth of a component carrier (CC), e.g., a primary CC or a secondary CC, or a CC in carrier aggregation (CA). In some examples, the UE (e.g., a receiver at the UE) may need to be warmed up in terms of having accurate frequency and/or time tracking, and/or channel estimate(s) on or before the start of the Active state and be ready to receive data. In some current implementations, coarse granularity of DRX states may be used or configured which may lead to simplicity in base station (or network) scheduler design at the expense of sub-optimal UE power saving.

In some aspects of 5G NR communications related to present disclosure, the system or the UE may support and facilitate finer granularity of states for DRX (e.g., C-DRX). In some examples, cross-slot scheduling may be used or configured. For example, $K_0$ (the difference in slot number between the slot in which a DL grant is transmitted by the base station and the slot in which the corresponding data is transmitted), may be equal or larger than one (1) (e.g., $K_0=1$ or larger), while $K_0$ in a conventional communication system (e.g., an LTE system) may be fixed to zero (0), which may indicate that the data is transmitted in the same slot (or the same subframe in LTE) as the grant. In some cases, $K_0$ is configurable by the UE and/or the network. In some examples, adaptive bandwidth for receptions may be used or configured. For example, a UE may use part or a portion of the CC bandwidth for signal receptions.

In some examples, WUS may be supported or configured. For example, a UE may wake up during the ON duration of an associated DRX cycle, however, if no data or signal is scheduled for the associated DRX cycle, the UE may waste power to perform a full-wake-up of the UE (e.g., full-wake-up of the modem at the UE) and get ready for data reception, and find out that there is no grant in the ON duration or the associated DRX cycle. In this case, the network may inform or indicate the UE in advance (e.g., one or more slots before the ON duration) if no data or grant (e.g., DL grant) is scheduled for the associated DRX cycle. In an example, the UE may skip the ON duration for the associated DRX cycle.

According to aspects of the present disclosure, multi-state DRX (e.g., C-DRX) schemes and operations for wireless communication are used, e.g., to save power at a UE or a network entity. In some aspects, finer granularity of DRX states may be used or configured, which may allow better tradeoff between power consumption and latency. In some examples, DRX (e.g., C-DRX) state transitions may be configured among multiple DRX states (e.g., three or more C-DRX states). For example, DRX transition(s) from a lower power state to a higher power state may be triggered by signaling, which may be explicit (e.g., via downlink control information (DCI)) or implicit (e.g., via a UL/DL grant). In another example, DRX transitions from a higher power state to a lower power state may be managed by one or more timers (e.g., whether a timer is expired), and explicit signaling may be supported.

In some aspects, the DRX states discussed herein may include several states that are optimized for low percentage of data scheduled, for example, a PDCCH monitoring state and/or a WUS monitoring state. In some implementations, when a UE is connected to a cell, the UE may monitor or detect a set of PDCCH candidates (e.g., a set of consecutive control channel elements (CCEs) on which a PDCCH may be mapped) in every subframe, slot, or TTI. In some examples, the UE may monitor or detect configured WUS resource at a configured periodicity. In some examples, comparing with PDCCH, WUS may carry fewer bits (e.g., 1-bit), narrower bandwidth, lower decoding complexity, lower sleep-wake transition overhead(s), fewer (or just one) search space(s), and may be with larger latency. On the other hand, a data ready state may be optimized for high percentage of data scheduled. In some examples, a WUS pre-wake-up state may be used or configured, and may allow the UE to skip of the ON duration of a DRX cycle (e.g., to save power).

In some aspects, transition(s) between DRX (e.g., C-DRX) states discussed herein may be based on UE capabilities or support for physical channels (e.g., "reception only" or "reception and transmission capable", control channel (CCH) only, data only, CCH and data, and/or WUS only), latency target (e.g., cross-slot scheduling or same-slot scheduling), and/or bandwidth situation or requirement (e.g., narrow or wide). In some examples, the transition(s) between DRX (e.g., C-DRX) states discussed herein may be dynamic. For example, dynamic transition(s) may be configured or performed between cross-slot and same-slot scheduling, between narrow and wide bandwidth, between larger and smaller periodicity for PDCCH and/or WUS monitoring. In another aspect, small data reception during a PDCCH monitoring state may be used or configured.

According to aspects of the present disclosure, the DRX states discussed herein may enhance the efficiency gain. In an example, for a relatively short DRX cycle, inactivity timer may be short. Depending on the traffic pattern, significant percentage of the DRX cycle may be empty. In this case, a WUS pre-wake-up state may reap most of the potential saving. In another example, for a relatively long DRX cycle, inactivity timer may be long. Therefore, a PDCCH monitoring state and/or a WUS monitoring state may be used or configured to allow potential grant monitoring at a lower power level, compared with operating in a data ready state.

According to aspects of the present disclosure, the DRX states discussed herein may be configurable. For example, the number of DRX states and/or the DRX state transition scheme(s) discussed herein may be configured by a base station (e.g., a next generation Node B or a gNB). In an example, the DRX states and/or the transition scheme(s) may be configured according to UE support (e.g., whether the UE supports WUS reception), and/or according to a traffic pattern or traffic statistics. For example, if traffic is periodic and nearly deterministic (e.g., packet-switched voice, voice over LTE (VoLTE), or voice over NR (VoNR)), 2-state DRX scheme may be used and may be efficient. In another example, if a DRX cycle is short due to low latency bound, the effective inactivity timer may be short, and a WUS monitoring state may not be used or configured.

In some aspects, short-slot (or mini-slot) and/or large subcarrier spacing (SCS) may lead to a short slot duration in 5G NR communications. In an example of millimeter wave (mmWave), a SCS with 120 kHz may lead to a slot duration with 125 µs. In an aspect, if a slot is too short in time, there may not be enough time for radio frequency (RF) retuning to perform bandwidth adaptation. In some cases, multiple slots may be aggregated together to make time for RF retuning, and PDCCH monitoring periodicity in the associated DRX state (e.g., PDCCH monitoring state) may be increased.

In some aspect, the UE or the system may support both short and long DRX cycles. In some implementations, a short DRX cycle and/or a long DRX cycle may not introduce an additional DRX state, and a short or a long DRX cycle is a scheme to adapt the duration of a DRX cycle.

In some aspects, implicit WUS may be used or configured based on tracking one or more reference signals (RSs). In some examples, the existence or non-existence of tracking one or more RSs before the ON duration may be indicated to the UE (e.g., via a "0" or "1"). For example, the existence of tracking one or more RSs before the ON duration may indicate that there will be data scheduled for the UE. In some cases, tracking RS may be UE-specific or group-specific. For example, in the case for group-specific, all UEs belonging to the group may be woken up if any one of the UEs would be scheduled. In some implementations, there may be net power saving if most of the time all of the UEs in the group are not "paged" or indicated. In some cases, the indication of whether tracking one or more RSs before the ON duration may be resource efficient, since tracking RS is intended for UE warm-up for ON duration. In some examples, even though WUS based on PDCCH signaling may be more robust, for implicit WUS based on tracking RS, the receiver at the UE may be designed to have a very low miss-detection rate at the expense of a higher false alarm rate.

Referring to FIG. 1, in an aspect, a wireless communication system 100 (e.g., a 5G NR system) includes at least a UE 12 or a UE 14 in communication coverage of at least one network entity 20 (e.g., a base station or a gNB, or a cell thereof, in a 5G NR network). UE 12 and/or UE 14 may communicate with a network via the network entity 20. In some aspects, multiple UEs including UE 12 and/or UE 14 may be in communication coverage with one or more network entities, including network entity 20. In an aspect, the network entity 20 may be a base station such a gNB in a 5G NR network, and/or an eNodeB/eNB in an LTE network. Although various aspects are described in relation to the Universal Mobile Telecommunications System (UMTS), LTE, or 5G NR networks, similar principles may be applied in other wireless wide area networks (WWAN). The wireless network may employ a scheme where multiple base stations may transmit on a channel. In an example, UE 12 and/or UE 14 may transmit and/or receive wireless communications to and/or from network entity 20. For example, the UE 12 and/or UE 14 may be actively communicating with network entity 20.

In some aspects, UE 12 and/or UE 14 may also be referred to by those skilled in the art (as well as interchangeably herein) as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. A UE 12 and/or UE 14 may be a cellular phone, a personal digital assistant (PDA), a wireless modem, a wireless communication device, a handheld device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc.), an appliance, a sensor, a vehicle communication system, a medical device, a vending machine, a device for the Internet-of-Things, or any other similar functioning device. Additionally, network entity 20 may be a macrocell, picocell, femtocell, relay, Node B, mobile Node B, small cell box, UE (e.g., communicating in peer-to-peer or ad-hoc mode with UE 12 and/or UE 14), or substantially any type of component that can communicate with UE 12 and/or UE 14 to provide wireless network access at the UE 12 and/or UE 14.

According to the present aspects, the UE 12 and/or UE 14 may include one or more processors 103 and a memory 130 that may operate in combination with a C-DRX management component 40 to control a conditioning component 42, a state transition component 44, and/or a scheduling component 46, for performing C-DRX management and related operations as described herein. In some examples (not shown in FIG. 1), the network entity 20 may include one or more processors 103 and a memory 130 that may operate in combination with an C-DRX management component 40 to perform DRX related operations and configurations.

In some aspects, the C-DRX management component 40 may perform DRX monitoring, scheduling, configuration and related operations. For example, the C-DRX management component 40 may be configured to perform multi-state C-DRX operations (e.g., state transitions).

In an aspect, the term "component" as used herein may be one of the parts that make up a system, may be hardware, firmware, and/or software, and may be divided into other components. The C-DRX management component 40 may be communicatively coupled with a transceiver 106, which may include a receiver 32 for receiving and processing radio frequency (RF) signals and a transmitter 34 for processing and transmitting RF signals. The C-DRX management component 40 may include the conditioning component 42, the state transition component 44, and/or the scheduling component 46, for performing DRX management and operations. The processor 103 may be coupled with the transceiver 106 and memory 130 via at least one bus 110.

The receiver 32 may include hardware, firmware, and/or software code executable by a processor for receiving data, the code comprising instructions and being stored in a memory (e.g., computer-readable medium). The receiver 32 may be, for example, an RF receiver. In an aspect, the receiver 32 may receive signals transmitted by UE 12 and/or UE 14. The receiver 32 may obtain measurements of the signals. For example, the receiver 32 may determine Ec/Io, SNR, etc.

The transmitter 34 may include hardware, firmware, and/or software code executable by a processor for transmitting data, the code comprising instructions and being stored in a memory (e.g., computer-readable medium). The transmitter 34 may be, for example, an RF transmitter.

In an aspect, the one or more processors 103 may include a modem 108 that uses one or more modem processors. The various functions related to the C-DRX management component 40 may be included in modem 108 and/or processors 103 and, in an aspect, may be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement components included in the C-DRX management component 40, including the conditioning component 42, the state transition component 44, and/or the scheduling component 46.

The C-DRX management component 40, the conditioning component 42, the state transition component 44, and/or the scheduling component 46, may include hardware, firmware, and/or software code executable by a processor for performing detecting, scheduling, monitoring and related DRX operations. For example, the hardware may include, for example, a hardware accelerator, or specialized processor.

Moreover, in an aspect, the UE 12 and/or UE 14 may include RF front end 104 and transceiver 106 for receiving and transmitting radio transmissions, for example, wireless communications 26. For example, transceiver 106 may transmit or receive a signal that includes DRX related configuration or indication. In some examples, the transceiver 106 may measure a received signal in order to determine signal quality and for providing feedback. For example, transceiver 106 may communicate with modem 108 to transmit messages generated by C-DRX management component 40 and to receive messages and forward them to C-DRX management component 40.

RF front end 104 may be connected to one or more antennas 102 and can include one or more low-noise amplifiers (LNAs) 141, one or more switches 142, 143, one or more power amplifiers (PAs) 145, and one or more filters 144 for transmitting and receiving RF signals. In an aspect, components of RF front end 104 can connect with transceiver 106. Transceiver 106 may connect to one or more modems 108 and processor 103.

In an aspect, LNA 141 can amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application. In an aspect, the RF front end 104 may provide measurements (e.g., Ec/Io) and/or applied gain values to the C-DRX management component 40.

Further, for example, one or more PA(s) 145 may be used by RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 can be used by RF front end 104 to filter a received signal to obtain an input RF signal. Similarly, in an aspect, for example, a respective filter 144 may be used to filter an output from a respective PA 145 to produce an output signal for transmission. In an aspect, each filter 144 may be connected to a specific LNA 141 and/or PA 145. In an aspect, RF front end 104 may use one or more switches 142, 143, 146 to select a transmit or receive path using a specified filter 144, LNA 141, and/or PA 145, based on a configuration as specified by transceiver 106 and/or processor 103.

Transceiver 106 may be configured to transmit and receive wireless signals through antenna 102 via RF front end 104. In an aspect, transceiver may be tuned to operate at specified frequencies such that UE 12 and/or UE 14 may communicate with, for example, the network entity 20. In an aspect, for example, modem 108 may configure transceiver 106 to operate at a specified frequency and power level based on the UE configuration of the UE 12 and/or UE 14 and communication protocol used by modem 108.

In an aspect, modem 108 may be a multiband-multimode modem, which can process digital data and communicate with transceiver 106 such that the digital data is sent and received using transceiver 106. In an aspect, modem 108 may be multiband and be configured to support multiple frequency bands for a specific communications protocol. In an aspect, modem 108 may be multimode and be configured to support multiple operating networks and communications protocols. In an aspect, modem 108 may control one or more components of the UE 12 and/or UE 14 (e.g., RF front end 104, transceiver 106) to enable transmission and/or reception of signals based on a specified modem configuration. In an aspect, the modem configuration may be based on the mode of the modem and the frequency band in use. In another aspect, the modem configuration may include multi-state DRX configuration associated with UE 12, UE 14 and/or the network entity 20 during cell selection and/or cell reselection.

The UE 12 and/or UE 14 may further include memory 130, such as for storing data used herein and/or local versions of applications or C-DRX management component 40 and/or one or more of its subcomponents being executed by processor 103. Memory 130 may include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, memory 130 may be a computer-readable storage medium that stores one or more computer-executable codes defining C-DRX management component 40 and/or one or more of the sub-components of C-DRX management component 40, and/or data associated therewith, when the network entity 20 is operating processor 103 to execute C-DRX management component 40 and/or one or more of its sub-components. In another aspect, for example, memory 130 may be a non-transitory computer-readable storage medium.

Figure 2A:
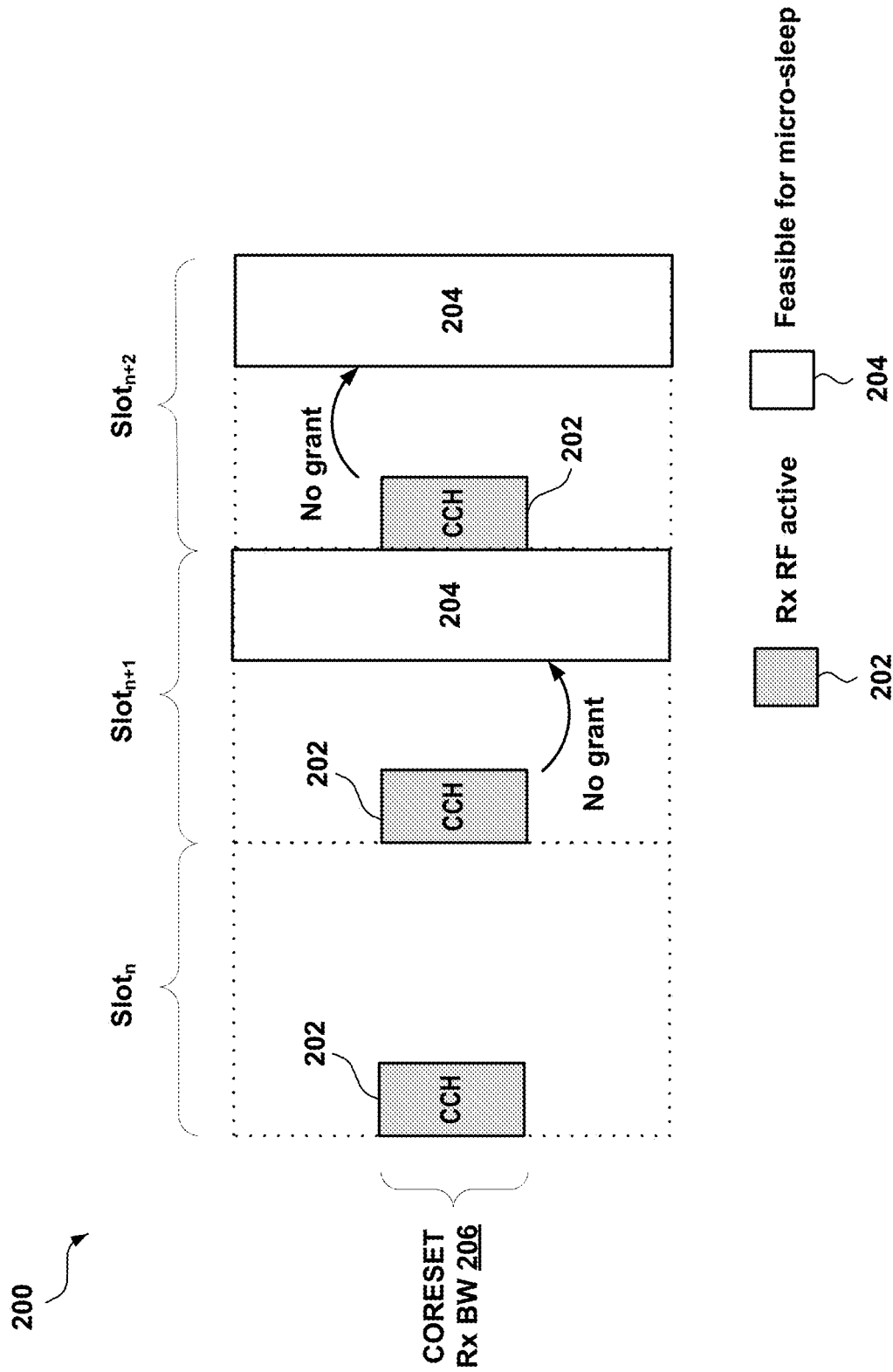
FIG. 2A illustrates an example of same-slot scheduling for wireless communications, according to one or more of the presently described aspects.

Referring to FIG. 2A, in some implementations, a downlink scheduling scheme 200 may be used by a UE (e.g., the UE 12 or UE 14 in FIG. 1). In an aspect, within a component carrier (CC), the UE may be configured to monitor a control channel (CCH) (e.g., PDCCH) within a control resource set or CORESET (e.g., a CORESET reception (Rx) bandwidth (BW) 206), which may, for example, span only a portion of the CC bandwidth in frequency domain. In time domain, in each slot (e.g., $Slot_n$, $Slot_{n+1}$, and/or $Slot_{n+2}$), the UE may be configured as "Reception (RX) RF active." For example, during the time duration 202 in one of $Slot_n$, $Slot_{n+1}$, and $Slot_{n+2}$, the UE may be configured to actively receive RF signals. In some cases, during the time duration 202, the UE may be configured to monitor a CCH (e.g., PDCCH) for control information (e.g., resource allocation, same-slot scheduling, or grant).

In an aspect, for example, if no grant is detected or received in a CCH during the time duration 202 (e.g., as shown in $Slot_{n+1}$ and $Slot_{n+2}$), micro-sleep may be configured at the UE during a time duration 204. In some examples, with same-slot scheduling or grant (e.g., $K_0=0$, which indicates that a DL grant and the data may be transmitted in a same slot), the time duration 204 that is feasible for micro-sleep may be limited (e.g., to a reduced/shortened time duration, as shown in $Slot_{n+1}$ and $Slot_{n+2}$) due to CCH or PDCCH processing latency (e.g., on or after the time duration 202). In some cases, the time duration limitation may reduce the depth of sleep and the extent of power saving at the UE. In some cases, PDCCH processing latency may be reduced to increase the time for micro-sleep (e.g., increase the time duration 204), however, the reduction of PDCCH processing latency may cause a higher peak power during PDCCH processing and/or a larger chip area used for a PDCCH processor, compared to PDCCH processing without latency reduction.

Figure 2B:
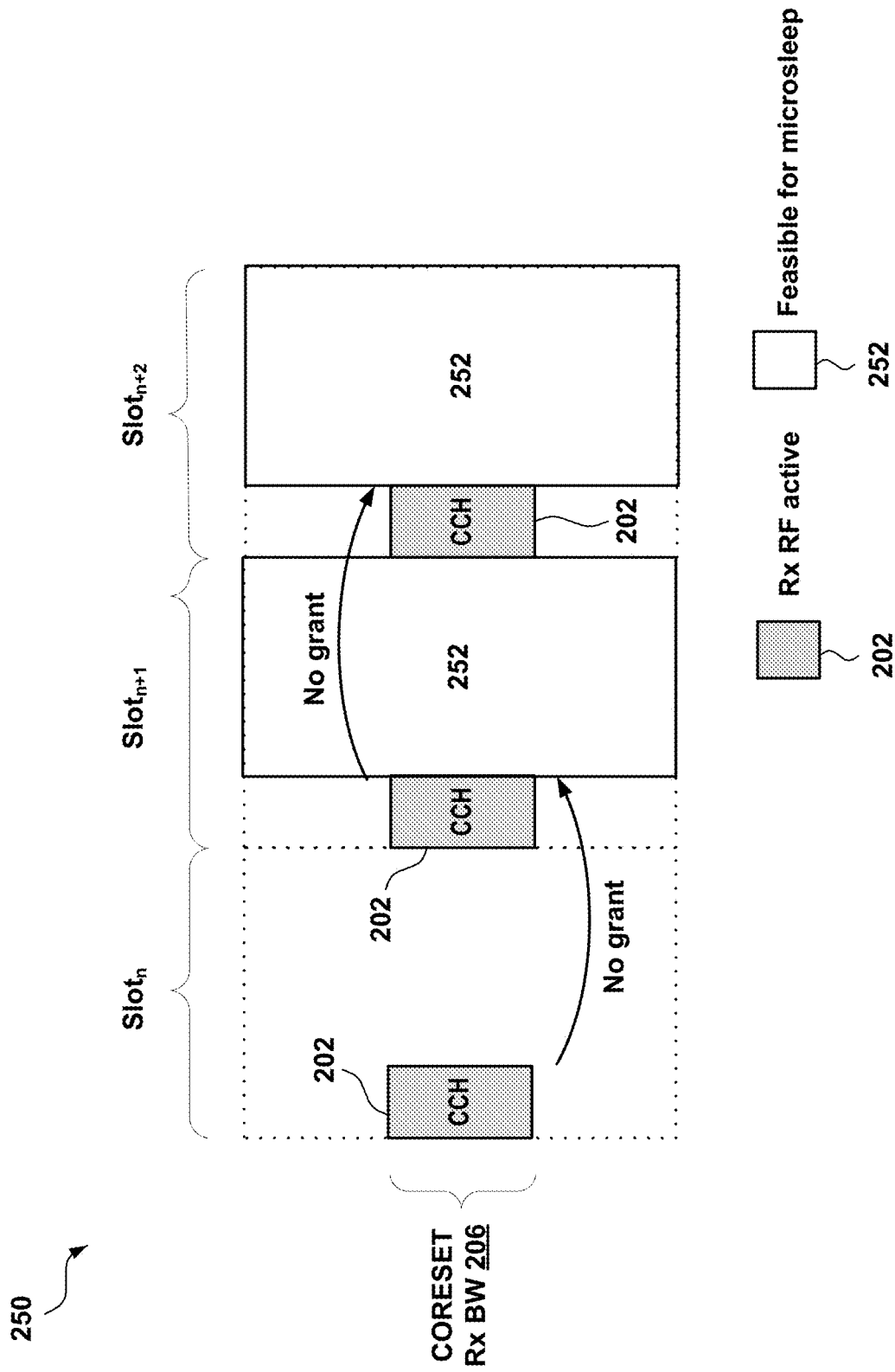
FIG. 2B illustrates an example of cross-slot scheduling for wireless communications, according to one or more of the presently described aspects.

Referring to FIG. 2B, in some implementations, a downlink scheduling scheme 250 may be used by a UE (e.g., the UE 12 or UE 14 in FIG. 1). In an aspect, similar to downlink scheduling scheme 200, the UE may be configured to monitor a CCH (e.g., PDCCH) within a control resource set or CORESET (e.g., the CORESET reception (Rx) bandwidth (BW) 206), which may, for example, span only a portion of the CC bandwidth in frequency domain. In time domain, in each slot (e.g., $Slot_n$, $Slot_{n+1}$, and/or $Slot_{n+2}$), the UE may be configured as "Rx RF active." For example, during the time duration 202 in one of $Slot_n$, $Slot_{n+1}$, and $Slot_{n+2}$, the UE may be configured to actively receive RF signals. In some cases, during the time duration 202, the UE may be configured to monitor a CCH (e.g., PDCCH) for control information (e.g., resource allocation, same-slot scheduling, or grant).

In an aspect, for example, if no grant is detected or received in a CCH during the time duration 202 (e.g., as shown in $Slot_n$ and $Slot_{n+1}$), micro-sleep may be configured at the UE during a time duration 252 in a consequent slot. In an example, if no grant is detected or received in a CCH during the time duration 202 in the $Slot_{n+1}$, micro-sleep may be configured at the UE during a time duration 252 in the $Slot_{n+2}$.

In some examples, as illustrated in FIG. 2B, with cross-slot scheduling or grant (e.g., $K_0=1$, which indicates that the data may be transmitted in the next slot of a slot in which a DL grant may be transmitted), the time duration 252 that is feasible for micro-sleep may be extended assuming PDCCH processing may be performed even during a micro-sleep state in a previous slot. For example, micro-sleep may be configured and extended from a time duration 204 to a time duration 252 at the UE during the $Slot_{n+2}$, in response to a determination that the PDCCH processing in the $Slot_{n+1}$ may be performed even during a micro-sleep state (e.g., a time duration 204 or 252 in $Slot_{n+1}$). Typically, micro-sleep mainly involves disabling the RF (e.g., disabling signal reception), so PDCCH processing in the modem may still be performed during micro-sleep (e.g., a time duration 204 or 252).

In some examples, compared with same-slot scheduling or grant (e.g., the downlink scheduling scheme 200), by using cross-slot scheduling or grant (e.g., the downlink scheduling scheme 250), PDCCH processing timeline may become less critical as long as the PDCCH processing is able to finish before the next slot, which may allow greater PDCCH processor design flexibility and lower operating point for clock and voltage (compared with same-slot scheduling or grant), and to save power at the UE. In some aspects, cross-slot scheduling may suffer slightly from a "overlap" effect as for the same number of slots to be scheduled, the modem active timeline may be extended by $K_0$ number of slots. In some examples, the additional power saving may overcome the cost for the "overlap" effect, especially if the percentage of CCH-only (e.g., grant-less or no grant) slots (e.g., $Slot_n$, $Slot_{n+1}$, and/or $Slot_{n+2}$) is significant.

Figure 3A:
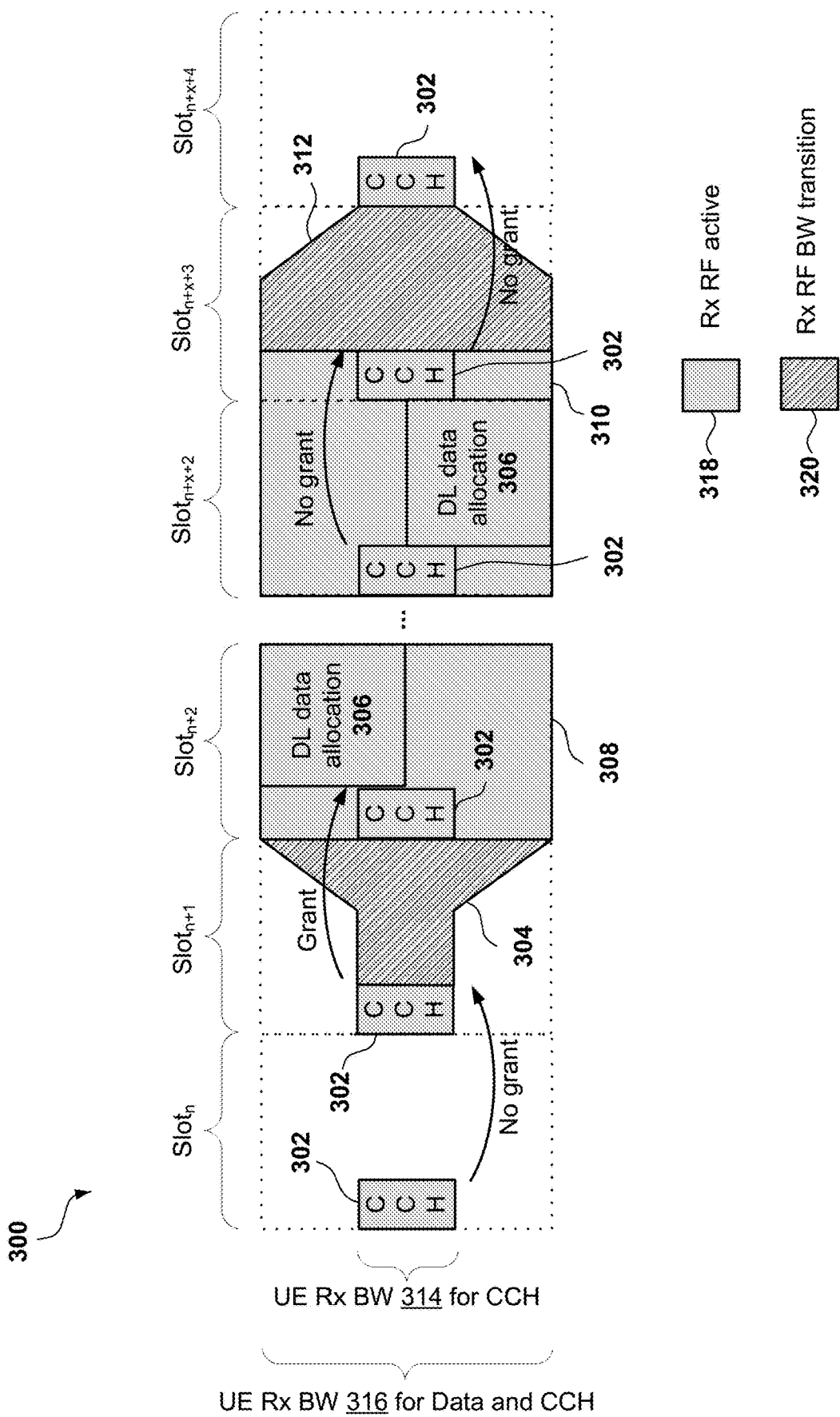
FIG. 3A illustrates a first example of adaptive bandwidth for receptions in a wireless communications system, according to one or more of the presently described aspects.

Referring to FIG. 3A, in an aspect, an adaptive reception scheme 300 may be used by a UE (e.g., the UE 12 or UE 14 in FIG. 1). In an example of 5G NR, the CCH bandwidth (e.g., an Rx BW 314 for CCH) may be smaller than the potential data bandwidth (e.g., an Rx BW 316 for data and CCH). In an aspect, within a CC, the UE may be configured to monitor a CCH (e.g., PDCCH) within a CORESET (e.g., the Rx BW 314), which may span only a portion of the CC bandwidth in frequency domain.

In some examples, the UE may be configured in a UE BW (e.g., the Rx BW 316) which is inclusive of the CORESET (e.g., the Rx BW 314) and potential DL data allocation (e.g., a DL data allocation 306). In some cases, the UE BW may be smaller than the CC BW. For example, CC BW may be 100 MHz, but UE is running a packetized-voice application that may not need more than 20 MHz BW, so UE BW may be configured to 20 MHz. In some examples, when the UE uses the adaptive reception scheme 300, an RF BW for UE reception (Rx BW) may adapt between the BW used for monitoring for CCH only (e.g., the Rx BW 314) which is narrower, and the BW used for receiving data and CCH (e.g., the Rx BW 316) which is wider.

In time domain, in each slot (e.g., $Slot_n$, $Slot_{n+1}$, $Slot_{n+2}$, ..., $Slot_{n+x+2}$, $Slot_{n+x+3}$, and/or $Slot_{n+x+4}$), the UE may be configured in an Rx RF active mode 318 during one or more monitoring or reception time periods. For example, during a time duration 302 in a slot (e.g., $Slot_n$, $Slot_{n+1}$, $Slot_{n+2}$, ..., $Slot_{n+x+2}$, $Slot_{n+x+3}$, and/or $Slot_{n+x+4}$), the UE may be configured to actively receive RF signals. In some examples, during the time duration 302, the UE may be configured to monitor a CCH (e.g., PDCCH) for control information such as resource allocation, same-slot scheduling, or grant (e.g., DL grant or uplink (UL) grant). In some cases, the UE may be configured in the Rx RF active mode 318 to actively receive RF signals (e.g., a CCH, a PDCCH, and/or a DL data allocation 306) during a time period 308 (e.g., a time period equals to a slot) or a time period 310 (e.g., a time period equals to the time period 302).

In some cases, BW adaptation may have transition latency. For example, within the same band, if the center frequency needs to be changed, the latency is in the order of 50 µs to 200 µs. In an aspect, triggering the transition dynamically based on grant may be desirable, while the CCH and UE BW (e.g., the union of data and CCH) may be semi-statically configured (e.g., using the Rx BW 316).

In some aspects, by using the adaptive reception scheme 300, a cross-slot grant may provide a framework to accommodate BW transition latency (as illustrated in FIG. 3A). In some examples, the UE may be configured in an Rx RF BW transition mode 320 during one or more time periods to accommodate BW transition(s). In an example, "no-grant to grant" transition 304 (e.g., in $Slot_{n+1}$) may trigger widening of BW, for example, transitioning from the Rx BW 314 to the Rx BW 316 to cover the union of data and CCH. In some cases, a number of consecutive no-grant triggers transition 312 (e.g., in $Slot_{n+x+3}$) to narrow UE BW, for example, from the Rx BW 316 to the Rx BW 314 that covers CCH reception.

Figure 3B:
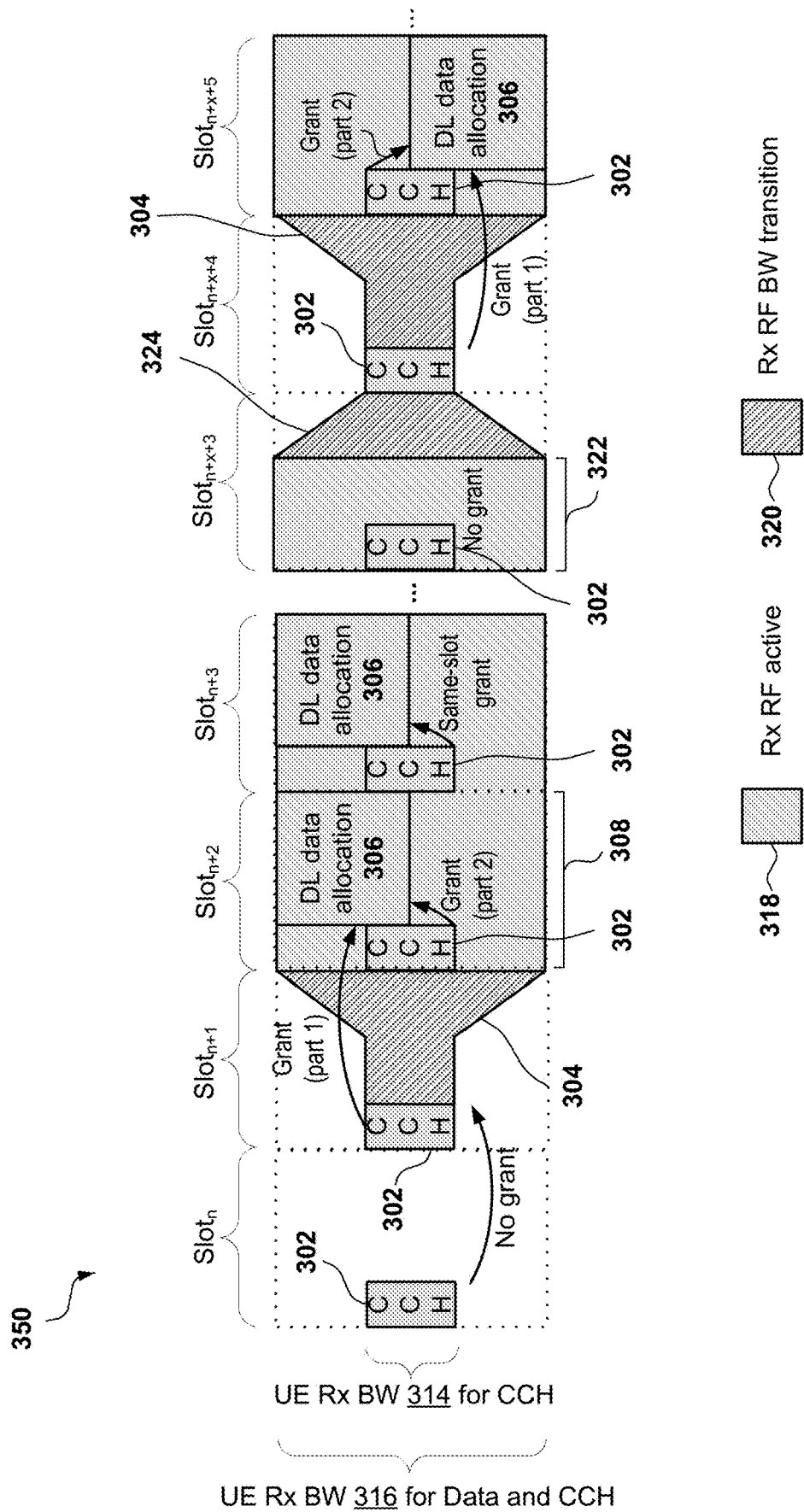
FIG. 3B illustrates a second example of adaptive bandwidth for receptions in a wireless communications system, according to one or more of the presently described aspects.

In an aspect, for cross-slot scheduling, narrowing of BW may be conditioned on at least two back-to-back no-grants (e.g., the transition 312 after least two back-to-back no-grants in $Slot_{n+x+2}$ and $Slot_{n+x+3}$) to avoid excessive switching of BW. For example, during a BW transition such as BW narrowing, grant is decoded for the next slot and BW narrowing may be aborted. In some examples, switching to same-slot grant during a wide BW state (e.g., a state that is expecting data reception) may be performed (e.g., as shown in FIG. 3B). In some cases, the gap at the end of a slot may be added or used to accommodate UL control block(s). For example, in some use cases of same-slot scheduling, each slot may have an opportunity for UL control transmission that has lowest latency (e.g., due to latency reduction from same-slot scheduling).

In an example, signaling explicit BW indication(s) to control the BW state may be used. For example, an explicit BW indication (e.g., via DCI) may indicate the UE to enter or exit a predetermined connected mode state. In some cases, the UE may use the explicit BW indication to identify or determine a configuration which may include at least one of cross-slot scheduling, same-slot scheduling, an adaptive bandwidth for signal reception (e.g., using bandwidth parts), low power setting, or high power setting at the UE.

Referring to FIG. 3B, in an aspect, an adaptive reception scheme 350 may be used by a UE (e.g., the UE 12 or UE 14 in FIG. 1). In an example of 5G NR, cross-slot grant does not necessarily imply that all DL grant information is transmitted in the DCI in the previous slot. For example, at the minimum, the BW and/or resource allocation information may be transmitted in a previous slot (e.g., Part 1 of the grant or DCI in $Slot_{n+1}$ or $Slot_{n+4}$). In an aspect, a two-part DCI may be used or configured. For example, in addition to the BW and/or resource allocation information that is transmitted in the previous slot, the remaining control information (e.g. modulation and coding scheme (MCS), new data indicator (NDI), or redundancy version (RV)) may be transmitted in the same slot as the data.

In an example, in a first slot (e.g., $Slot_{n+1}$), the UE may detect a Part 1 grant (e.g., having the first part of the DCI) from the CCH (in $Slot_{n+1}$) during the time period 302, and may be configured in an Rx RF BW transition mode 320 to accommodate BW transition. In this example, "no-grant to grant" transition 304 in $Slot_{n+1}$ may trigger widening of BW, for example, transitioning from the Rx BW 314 to the Rx BW 316 to receive data and control information. In an aspect, in a second slot (e.g., a consecutive slot such as $Slot_{n+2}$) may be a transition slot having a time period 308 with a cross-slot grant, and a two-part DCI may be used for the transition slot. For instance, a Part 1 grant (having the first part of the DCI) from the CCH in $Slot_{n+1}$ and a Part 2 grant (having the second part of the DCI) from the CCH in $Slot_{n+2}$ may form a two-part grant or two-part DCI used for DL data allocation 306 within the transition slot $Slot_{n+2}$. In another example, the Part 1 grant and Part 2 grant may be repetition of a full or single-part DCI for robustness, with indication for whether the reception is cross-slot or same-slot. In some cases, the second part of the DCI may provide an opportunity for the UE to detect if the first part of the DCI was missed due to PDCCH decoding error, and rectify the issue for the following slot by switching to a wide BW state.

In an aspect, once the UE transitions from a narrow BW state (e.g., a state that is for monitoring or receiving CCH, and/or has an Rx BW 314 for CCH reception) to a wide BW state (e.g., a state that is expecting data reception, and/or has an Rx BW 316 for data and CCH reception), same-slot scheduling or grant may be used. For example, after the transition slot (e.g., the second slot, $Slot_{n+2}$, having a two-part grant and/or two-part DCI for DL data allocation), same-slot scheduling or grant may be used in a third (consecutive) slot (e.g., $Slot_{n+3}$) for DL data allocation and signal reception.

In some examples, using the adaptive reception scheme 350, similar to the adaptive reception scheme 300 in FIG. 3A, the UE may be configured in an Rx RF active mode 318 during one or more monitoring or reception time periods (e.g., time periods 302, 308, and/or 322) in one or more slots (e.g., $Slot_n$, $Slot_{n+1}$, $Slot_{n+2}$, $Slot_{n+3}$, ..., $Slot_{n+x+3}$, $Slot_{n+x+4}$, and/or $Slot_{n+x+5}$). For example, during a time duration 302 in a slot (e.g., $Slot_n$, $Slot_{n+1}$, $Slot_{n+2}$, $Slot_{n+3}$, ..., $Slot_{n+x+3}$, $Slot_{n+x+4}$, and/or $Slot_{n+x+5}$), the UE may be configured to actively receive RF signals that include control information. In some examples, during the time duration 302, the UE may be configured to monitor one or more CCHs (e.g., PDCCH) for control information (e.g., DCI) such as resource allocation, cross-slot scheduling, same-slot scheduling, or grant (e.g., DL grant or uplink (UL) grant). In some cases, the UE may be configured in the Rx RF active mode 318 to actively receive RF signals (e.g., a CCH, a PDCCH, and/or a DL data allocation 306) during the time period 308 (e.g., a time period equals to a slot) having grant, or the time period 322 (e.g., a time period between the time period 302 and the time period 308) without grant.

In another aspect, a threshold number of consecutive "no grant" may trigger transition back to a narrow BW state (e.g., a state that is for monitoring or receiving CCH, and/or has an Rx BW 314 for CCH reception). For example, after a number of consecutive no-grant CCHs or slots, the UE may be configured or triggered to perform transition 324 (e.g., in $Slot_{n+x+3}$) to narrow UE BW, for example, from the Rx BW 316 to the Rx BW 314 that covers CCH reception. In this example, the UE may be configured to perform "no-grant to grant" transition 304 in Slot transition from the Rx BW $Slot_{n+x+4}$ to 314 to the Rx BW 316 for cross-slot grant (e.g., two-part grant or DCI), as illustrated in $Slot_{n+x+4}$ and $Slot_{n+x+5}$ in FIG. 3B.

Figure 4:
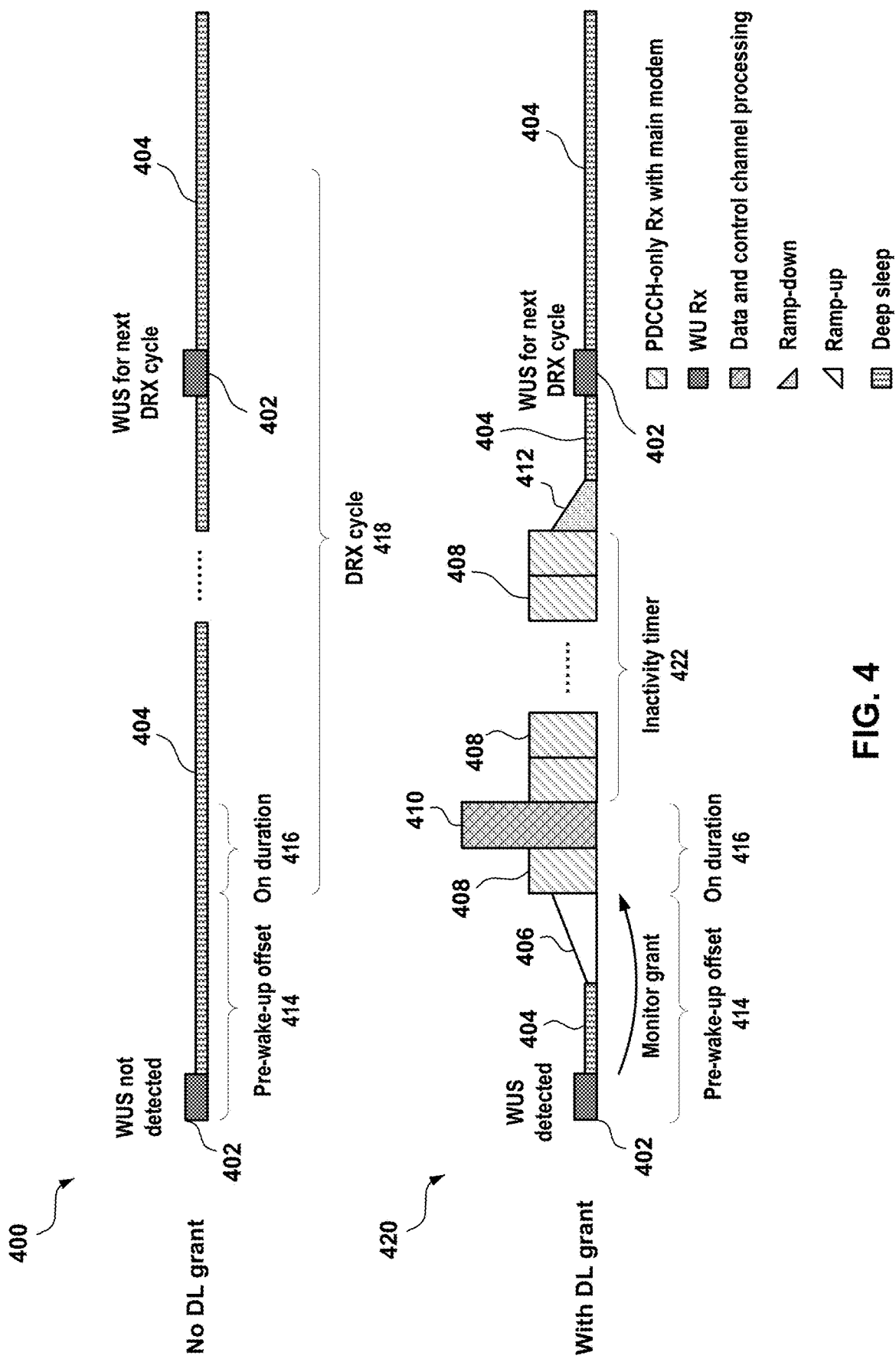
FIG. 4 illustrates an example of wake-up signaling (WUS) in a wireless communications system, according to one or more of the presently described aspects.

Referring to FIG. 4, in an aspect, two examples of WUS schemes, a WUS scheme 400 and a WUS scheme 420, may be used by a UE (e.g., the UE 12 or UE 14 in FIG. 1) in a wireless communication system (e.g., 5G NR). In some examples, the y-axis in FIG. 4 represents the instantaneous power consumption level across the timeline in the x-axis. In some cases, power saving may be realized by opportunistic activation of the higher power consuming state. For example, if no data to be scheduled or no DL grant for a DRX cycle, the UE may not have to waste power to perform a full-wake-up of the modem and get ready for data reception, only to find out that there is no grant. In some cases, WUS may be optimized so that decoding on the UE can be lower complexity (and/or lower power), compared to decoding PDCCH with its associated overhead. Also, sleep-wake transition overhead may be smaller for a WUS reception.

In an example of using the WUS scheme 400, if no data to be scheduled or no DL grant for a DRX cycle 418, a "pre-wake-up" (PWU) duration 402 may be added before an ON duration 416. For instance, one or more PWU durations 402 may be used for WUS monitoring. If WUS is not detected during a PWU duration 402, the UE may skip an ON duration 416 for the associated DRX cycle 418. In some cases, the UE may be configured in a deep sleep state 404 (e.g., State 0 as discussed below) if WUS is not detected during a PWU duration 402.

In another example, in the WUS scheme 420, a PWU offset 414 before the ON duration 416 may be used to support "warm-up" of the full modem operations in a DRX cycle. In some cases, the PWU offset 414 may be semi-statically configured. In this example, once the UE monitors or detects a grant (e.g., a DL grant or DCI) during a PWU duration 402 and a PWU offset 414 is configured, before the ON duration 416, the UE may set to the deep sleep state 404, and then "warm-up" by using a power ramp-up state 406. During the ON duration 416, the UE may be configured to receive DL control information on PDCCH with main modem in a PDCCH-only Rx state 408, followed by a data and control channel processing state 410. During an inactivity timer 422 (within a DRC cycle), the UE may be configured to continue receive DL control information on PDCCH with main modem in the PDCCH-only Rx state 408. Once the inactivity timer 422 expires, the UE may be configured to a power ramp-down state 412, and then back to the deep sleep state 404. In some cases, the UE may monitor WUS for the next DRX cycle (e.g., in a PWU duration 402), and may return to the deep sleep state 404 if no grant or WUS is detected.

Figure 5:
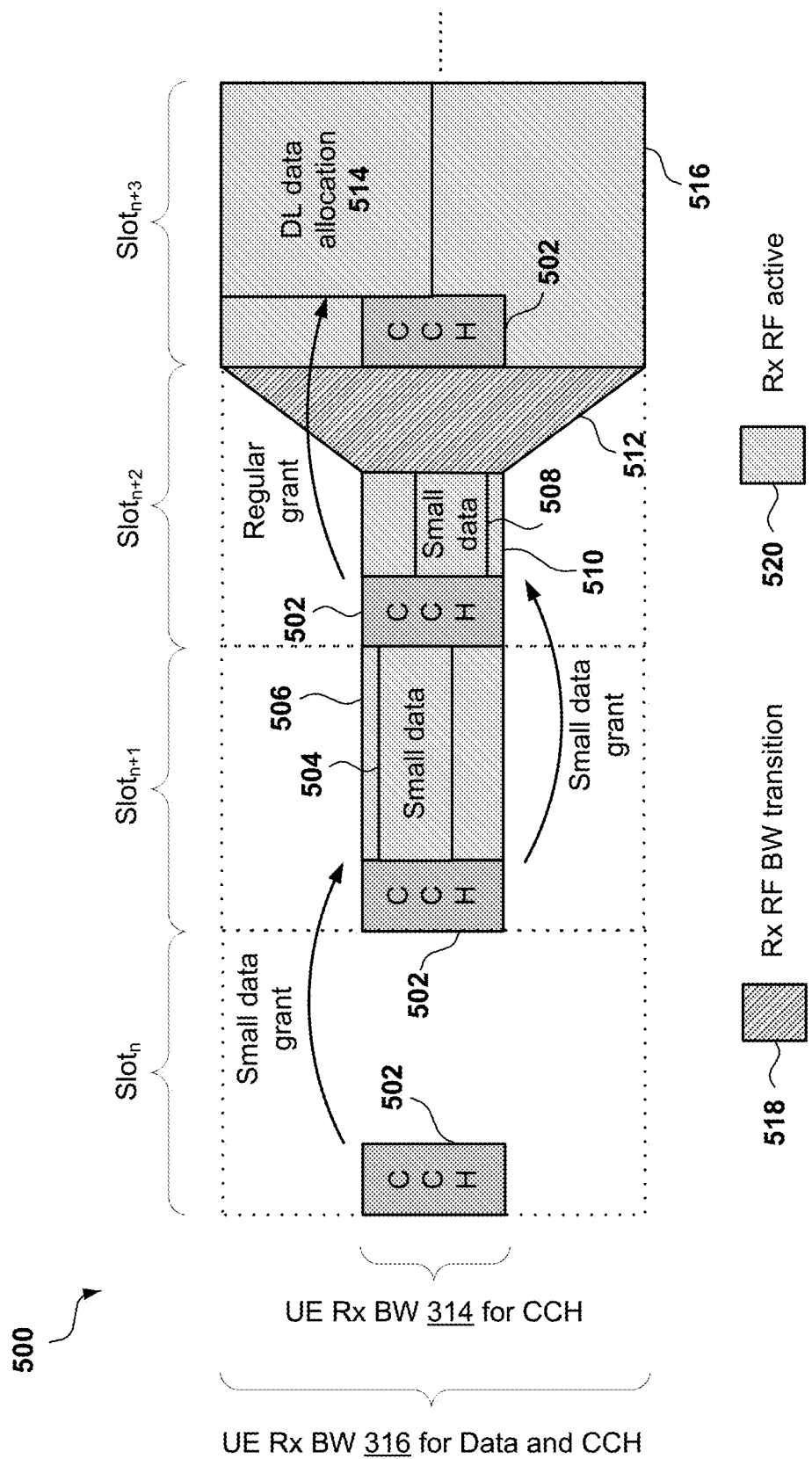
FIG. 5 illustrates an example of small data reception for control channel monitoring, according to one or more of the presently described aspects.

Referring to FIG. 5, in an aspect, a small data reception scheme 500 for enhanced CCH monitoring may be used by a UE (e.g., the UE 12 or UE 14 in FIG. 1) in a wireless communications system (e.g., 5G NR). In some examples, a PDCCH monitoring state (e.g., State 2 as discussed below) may be supported and enhanced by using small data reception within the BW for CCH monitoring. In an aspect, the enhancement may include explicitly signaling of "small data" grant, and may have no effect on state transition or timer. Regular grant may trigger transition to a "data ready" state (e.g., State 1 as discussed below).

In an aspect, the small data reception scheme 500 may be used by a UE (e.g., the UE 12 or UE 14 in FIG. 1) that is configured to use cross-slot scheduling. In some cases, same-slot scheduling is also feasible at the expense of less effective micro-sleep. In some examples, when small data (e.g., small data 508) is scheduled in the same slot as BW transition, only partial slot may be useable, and this partial slot utilization may be restricted to certain type of data, for example, MAC control elements (CEs), or other layer 1 (L1) control information embedded in data. In some examples, the small data reception scheme 500 may be used by the UE to avoid switching to "data ready" state for small data.

In an example of using the small data reception scheme 500, the CCH bandwidth (e.g., an Rx BW 314 for CCH) may be smaller than the potential data bandwidth (e.g., an Rx BW 316 for data and CCH). In an aspect, the UE may be configured to monitor a CCH (e.g., PDCCH) within a CORESET (e.g., the Rx BW 314), which may span only a portion of the CC BW in frequency domain.

In some examples, the UE may be configured in a UE BW (e.g., the Rx BW 316) which is inclusive of the CCH (e.g., the Rx BW 314) and potential DL data allocation (e.g., a DL data allocation 514) in one or more slots (e.g., $Slot_{n+3}$). In some cases, when the UE detects a small data grant, the UE BW may be set to the Rx BW 314. For example, once the UE detects a small data grant in $Slot_n$, the UE may use a portion of $Slot_{n+1}$ (e.g., a small data reception 504 having a time duration 506 and a BW equal or less than the Rx BW 314) receive or process the small data. In some examples, when the UE uses the small data reception scheme 500, an RF BW for UE reception (Rx BW) may adapt between the BW used for monitoring for CCH only (e.g., the Rx BW 314) which is narrower, and the BW used for receiving data and CCH (e.g., the Rx BW 316) which is wider.

In time domain, in each slot (e.g., $Slot_n$, $Slot_{n+1}$, $Slot_{n+2}$, and/or $Slot_{n+3}$), the UE may be configured in an Rx RF active mode 520 during one or more monitoring or reception time periods. For example, during a time duration 502 in a slot (e.g., $Slot_n$, $Slot_{n+2}$, and/or $Slot_{n+3}$), the UE may be configured to actively receive RF signals. In some examples, during the time duration 502, the UE may be configured to monitor a CCH (e.g., PDCCH) for control information such as resource allocation, cross-slot or same-slot scheduling, or grant (e.g., DL grant or UL grant). In some cases, the UE may be configured in the Rx RF active mode 520 to actively receive RF signals (e.g., small data 504 or 508) during a time period 506 or 510 (e.g., a time period less than a slot) or a time period 516 (e.g., a time period equals to a slot).

In some examples, the UE may be configured in an Rx RF BW transition mode 518 during one or more time periods to accommodate BW transition(s). In an example, a BW transition 512 (e.g., in $Slot_{n+2}$) may trigger widening of BW, for example, transitioning from the Rx BW 314 to the Rx BW 316 to cover a regular grant (e.g., a grant for a DL data allocation 514) and CCH reception (e.g., in $Slot_{n+3}$).

Figure 6:
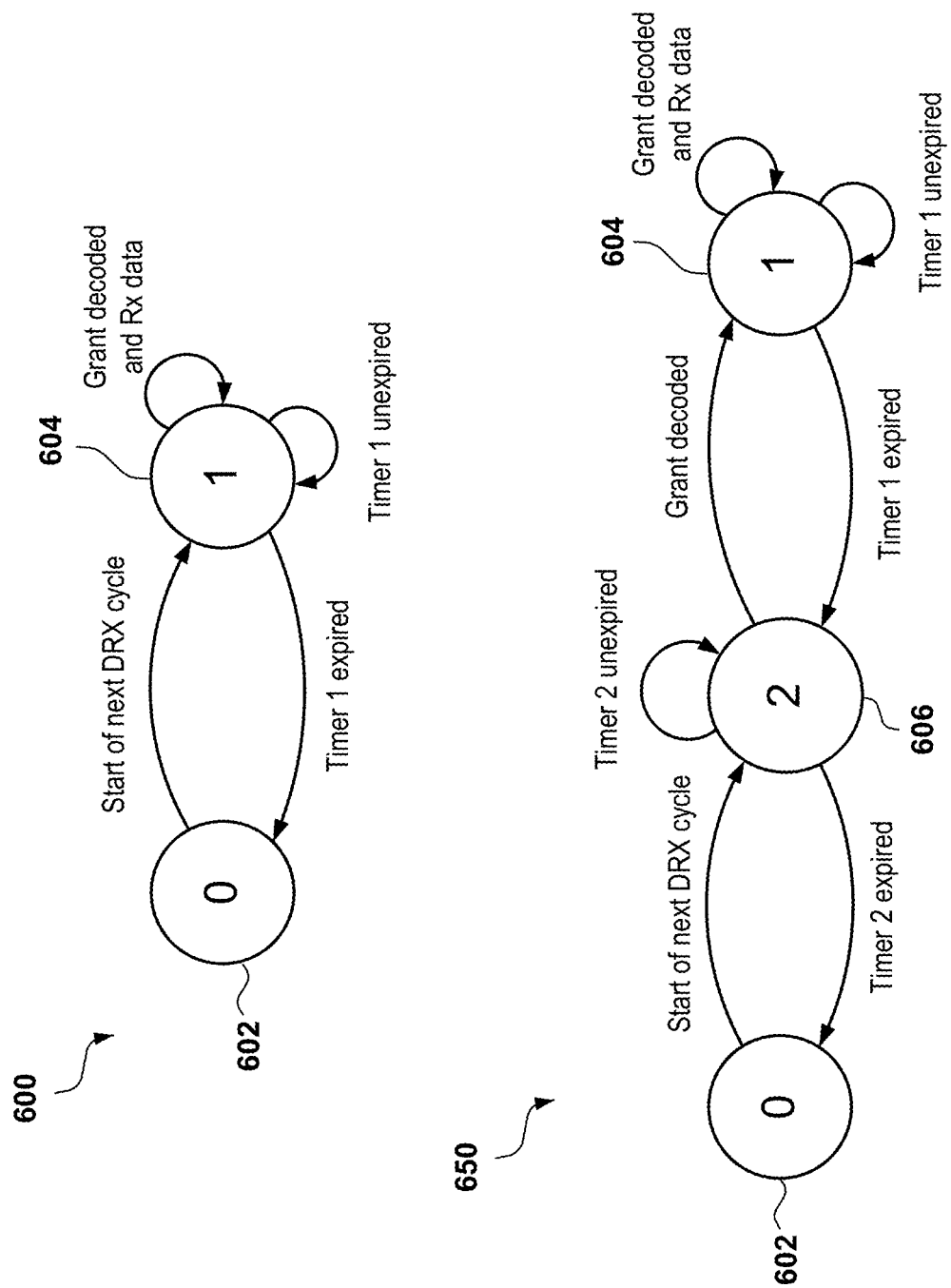
FIG. 6 is an example of a first state diagram using a 2-state scheme and a second state diagram using a 3-state scheme, according to one or more of the presently described aspects.

Referring to FIG. 6, in an aspect, state diagrams for a 2-state scheme 600 (e.g., in an LTE system) and a 3-state scheme 650 may be used or configured by a UE (e.g., the UE 12 or UE 14 in FIG. 1) in a wireless communications system (e.g., 5G NR). In some aspects, a multi-state C-DRX scheme (e.g., the 2-state scheme 600 or the 3-state scheme 650) may use two or more states or configurations discussed herein. For example, a DRX or Sleep state 602 (State 0) may be used for the UE in deep sleep and is not expected to receive or monitor any signal. In an example, the UE may transition out of DRX or Sleep state 602 (e.g., to another state such as a Data Ready state 604 as discussed below) during the start of a next DRX cycle or before the PWU duration for the next DRX cycle.

In another aspect, a Data Ready state 604 (State 1) may be used for efficient reception of data. When the UE is in Data Ready state, same-slot scheduling may be used or configured (e.g., $K_0=0$). In some examples, micro-sleep (e.g., discussed in FIG. 2A and FIG. 2B) may not be effective, and the percentage of no grant time duration during Data Ready state may be as small as possible. In an aspect, a UE Rx BW in Data Ready state may cover potential data allocation and CCH (e.g., as discussed in FIG. 3A, FIG. 3B, or FIG. 5), and the UE Rx BW may be semi-statically configured and may be UE-specific. In some examples, the US may enter Data Ready state when the UE knows or is indicated that data will be scheduled (e.g., when a cross-slot grant is decoded when the UE is in another state other than the Data Ready state 604). In some cases, when Timer 1 expires, the UE may exit the Data Ready state 604 (e.g., to the DRX or Sleep state 602). Timer 1 is a count-down timer and may reset with a pre-configured value whenever a grant is decoded, and Timer 1 may decrement when no grant is detected. In some examples, explicit dynamic Layer 1 (L1) signaling (e.g., via DCI) for the entrance and/or exit of the Data Ready state may be supported or used by the UE.

In some examples, C-DRX in LTE may use a 2-state design (e.g., having the DRX or Sleep state 602 (State 0) and the Data Ready state 604 (State 1)). In an example, a long DRX cycle and/or a short DRX cycle supported in LTE may affect the duration of a DRX cycle, and may not be considered as an introduction of one or more additional states. In an example, when the Data Ready state 604 (State 1) is initially entered, Timer 1 is set to an "ON duration" value. Whenever a grant is decoded, Timer 1 may be re-initialized to "inactivity timer duration" value.

Regarding the 3-state scheme 650, in an example, a PDCCH monitoring state 606 (State 2) is added in between the DRX or Sleep state 602 (State 0) and the Data Ready state 604 (State 1) based on the 2-state scheme 600. In an aspect, the correspondence to an LTE 2-state design may include one or more values for setting Timer 2 which may be similar to an "ON duration," and a sum of the Timer 1 and the Timer 2 is equivalent or close to the "inactivity timer duration."

In particular, the PDCCH monitoring state 606 (State 2) may be used for monitoring of CCH, and make the monitoring more efficient. For example, cross-slot scheduling may be used (e.g., $K_0=1$), and micro-sleep operations are more effective due to significant percentage of slots having no grant expected in the PDCCH monitoring state 606. In an aspect, the Rx BW may cover only the configured CORESET that the UE is monitoring or required to monitor/detect. In some examples, upon successful decoding of a grant (e.g., DL or UL grant), the UE may transition from the PDCCH monitoring state 606 to another state, for example, the Data Ready state 604.

Figure 10:
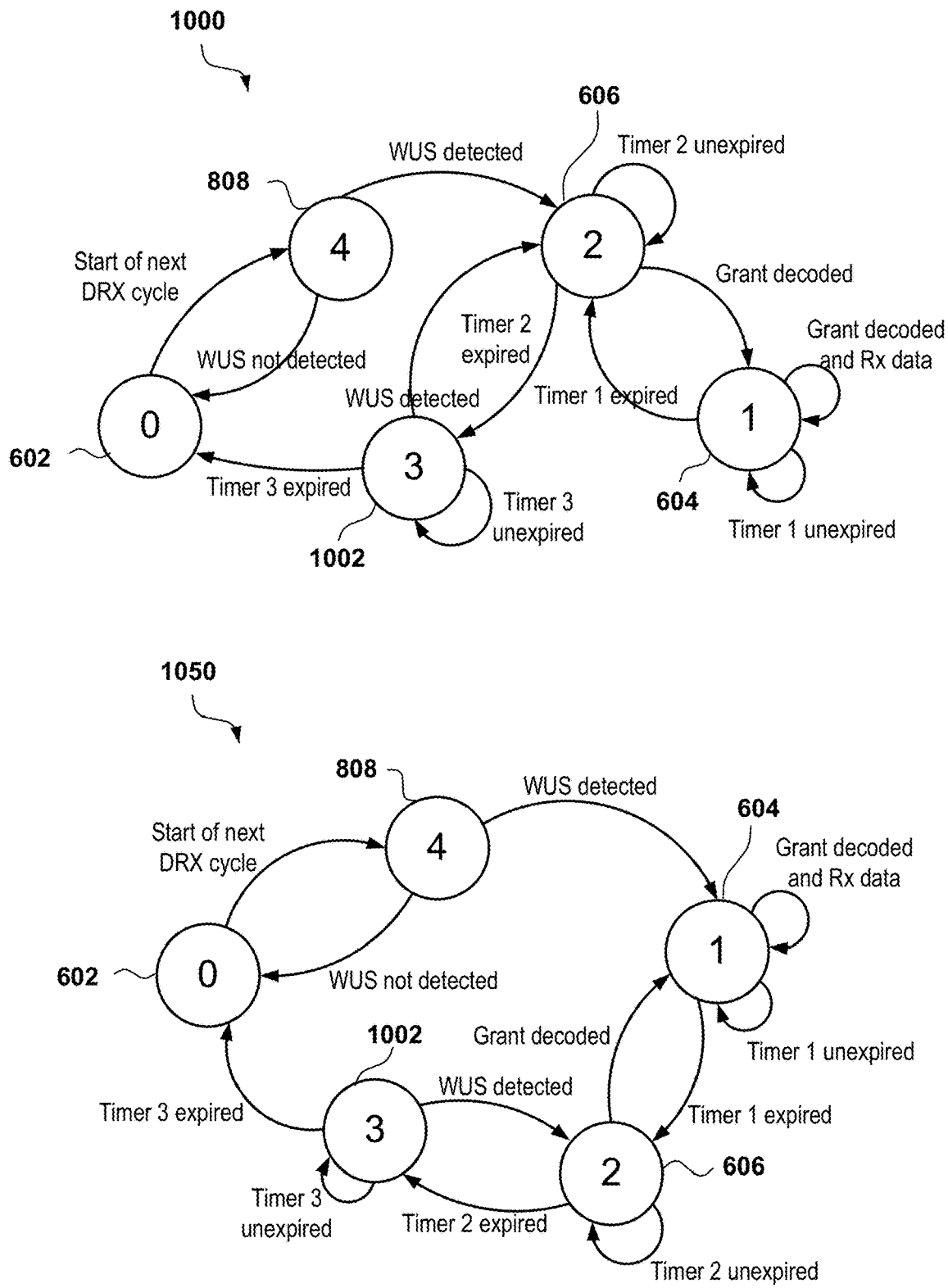
FIG. 10 illustrates two examples of state diagrams for two 5-state schemes, according to one or more of the presently described aspects.

In some examples, the UE may transition from the PDCCH monitoring state 606 to the DRX or Sleep state 602 (or a WUS monitoring state (State 3), as discussed in FIG. 10) if a Timer 2 expires. In some cases, the Timer 2 is a count-down timer re-initialized with a pre-configured value whenever the UE enters the PDCCH monitoring state 606, and the Timer 2 decrements when no grant is detected. In particular, for example, one or more asymmetric values may be used depending on the previous or originating state. In an example, different originating states (e.g., the DRX or Sleep state 602, and the Data Ready state 604) may trigger different initialization values. In some cases, explicit and dynamic L1 signaling (e.g., via DCI) for the entrance/exit of the PDCCH monitoring state 606 may be supported or used. In one implementation, the UE may be configured to use a larger periodicity of PDCCH and/or aggregated slots. For example, instead of monitoring PDCCH every slot, the UE may monitor at a larger periodicity (e.g., every 2 slots or more) which may be UE-specific. In another implementation, the UE may reduce the periodicity of PDCCH by aggregating two or more slots.

In some implementations, timer expiration discussed herein may be considered as the count value reaching zero. In other implementations, timer expiration discussed herein may refer to a timer reaching a certain predetermined value (e.g., an integer value such as 1, 2, 3, etc.).

Figure 7A:
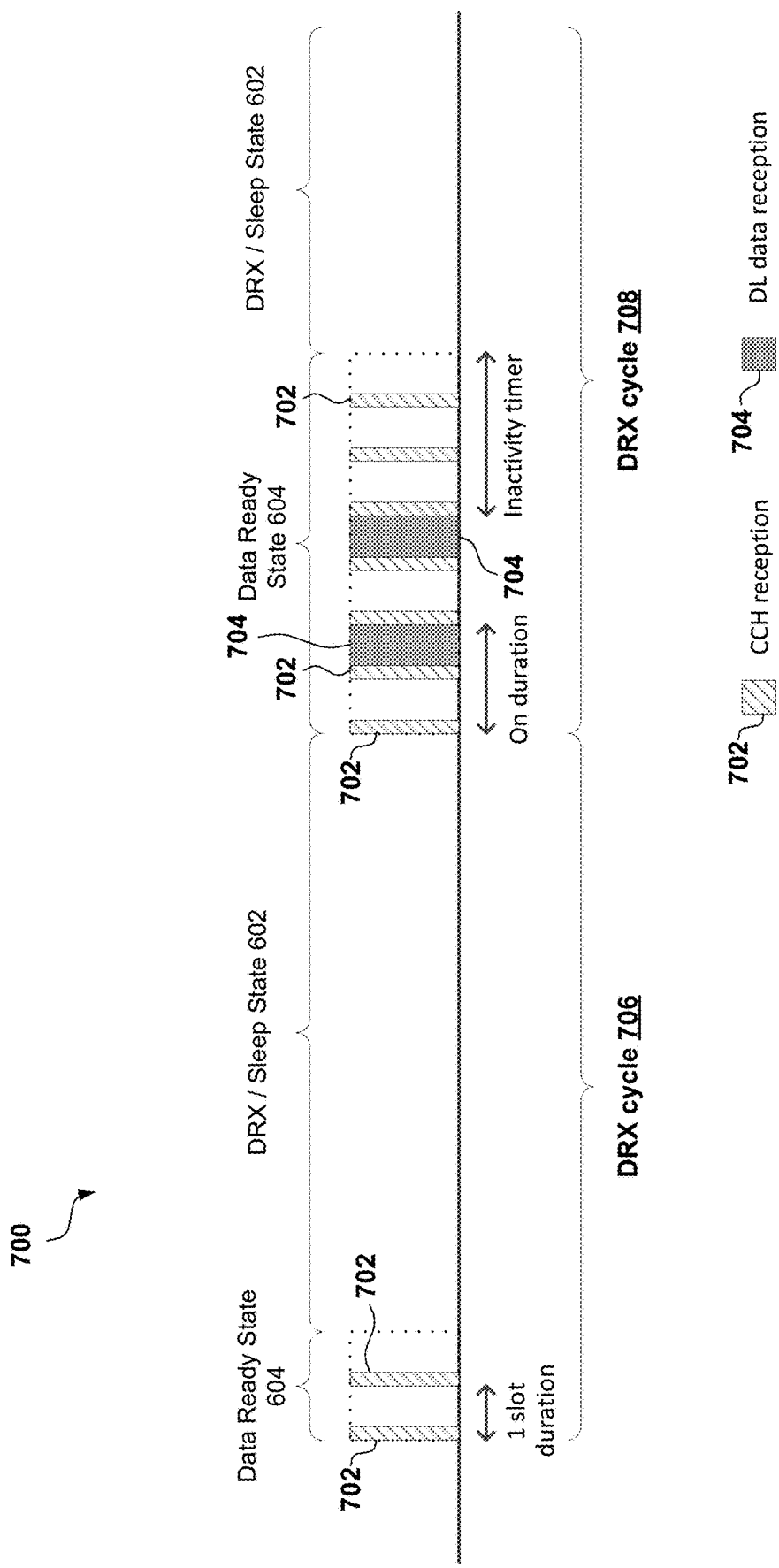
FIG. 7A is an example of a timeline diagram for a 2-state scheme, according to one or more of the presently described aspects.

Referring to FIG. 7A, in an aspect, a timeline diagram 700 with a 2-state scheme (e.g., the 2-state scheme 600) is shown. In FIG. 7A, Y-axis indicates the amount of Rx BW actively in use and is proportional to the power consumption, while the dotted outline illustrates the receiving BW that the RF circuitry may be configured to even if no active reception is taking place.

In an example, a UE (e.g., the UE 12 or UE 14 in FIG. 1) may be configured to operate in one of two states, for example, the DRX or Sleep state 602 (State 0) or the Data Ready state 604 (State 1), and perform state transitions between the two states (e.g., using the 2-state scheme 600 in FIG. 6). In a DRX cycle 706, the UE may perform one or more CCH receptions 702, for example, perform monitoring or detecting PDCCH for DCI or grant information, during the Data Ready state 604 (State 1). In some cases, the UE may not detect any grant for DL or UL data allocation, and as discussed above in FIG. 6, when the Timer 1 expires, the UE may exit the Data Ready state 604 (State 1) and enter the DRX or Sleep state 602 (State 0), until the end of the DRX cycle 706.

In a DRX cycle 708, similarly, the UE may perform one or more CCH receptions 702, for example, monitoring or detecting a PDCCH for DCI or grant information, during the Data Ready state 604 (State 1). In some cases, the UE may detect DL grant and perform DL data reception 704 in one or more slots, for example, during the ON duration and/or before the inactivity timer started. In an aspect, the UE may continue monitor CCH or perform one or more CCH receptions 702 during the time period that the inactivity timer is not expired. In some cases, during the DRX cycle 708, when the inactivity timer expires, the UE may exit the Data Ready state 604 (State 1) and enter the DRX or Sleep state 602 (State 0), until the end of the DRX cycle 708.

Figure 7B:
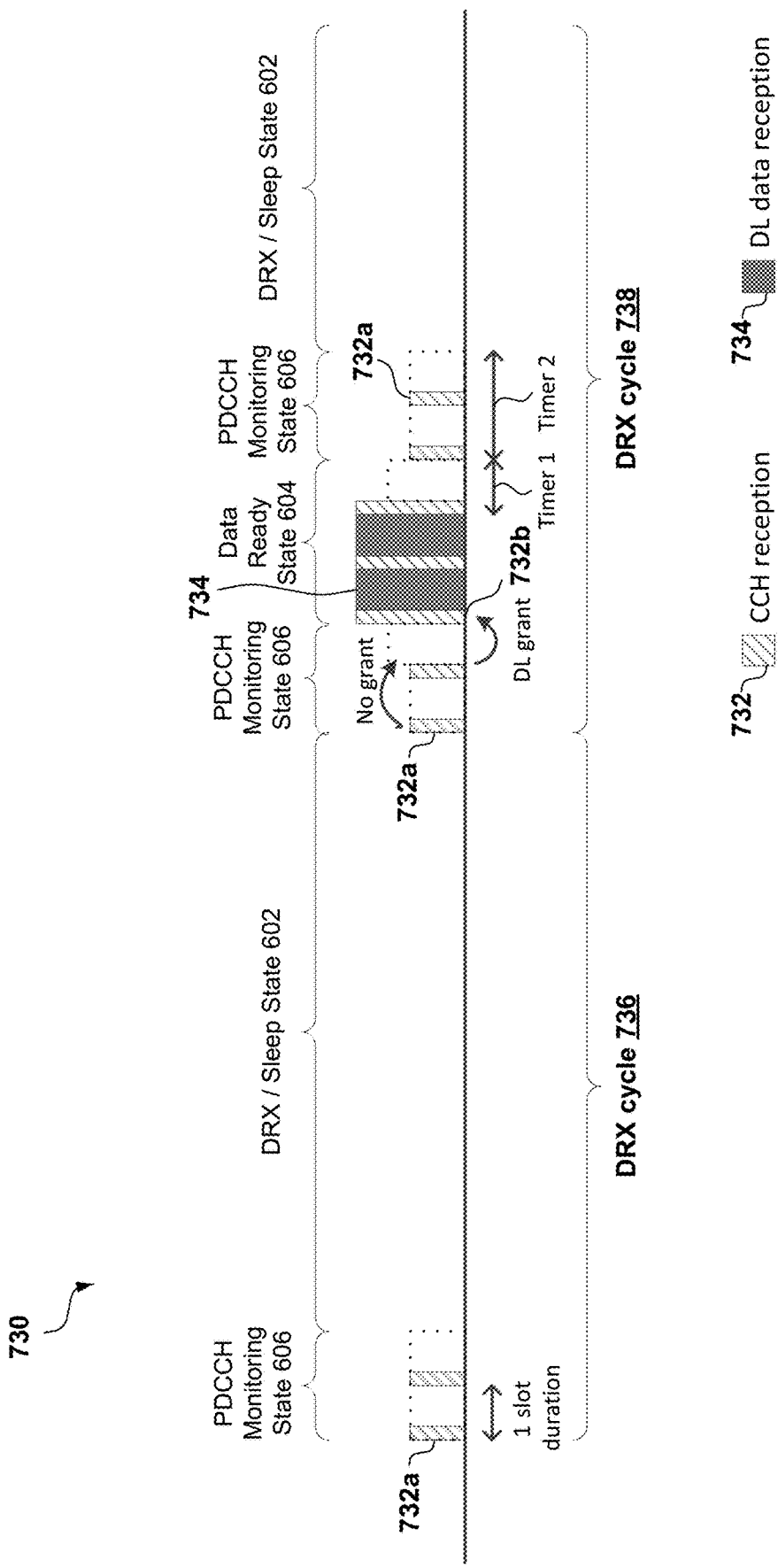
FIG. 7B is a first example of a timeline diagram for a 3-state scheme, according to one or more of the presently described aspects.

Referring to FIG. 7B, in an aspect, a timeline diagram 730 with a 3-state scheme (e.g., the 3-state scheme 650) is shown. Similar to FIG. 7A, in FIG. 7B, Y-axis indicates the amount of Rx BW actively in use and is proportional to the power consumption, while the dotted outline illustrates the receiving BW that the RF circuitry may be configured to even if no active reception is taking place. In the timeline diagram 730, the ON duration may be configured to 2 slots, the Timer 1 is configured to 1 slot, and the Timer 2 may be configured to 2 slots.

In an example, a UE (e.g., the UE 12 or UE 14 in FIG. 1) may be configured to operate in one of three states or configurations, for example, the DRX or Sleep state 602 (State 0), the Data Ready state 604 (State 1), or the PDCCH monitoring state 606 (State 2), and perform state transitions among the three states (e.g., using the 3-state scheme 650 in FIG. 6). In a DRX cycle 736, the UE may perform one or more CCH receptions 732a, for example, perform monitoring or detecting PDCCH for DCI or grant information, during the PDCCH monitoring state 606 (State 2). In some cases, the UE may not detect any grant for DL or UL data allocation, and when the Timer 2 expires as discussed in the 3-state scheme 650, the UE may transition from the PDCCH monitoring state 606 to the DRX or Sleep state 602, until the end of the DRX cycle 736.

In a DRX cycle 738, similarly, the UE may perform one or more CCH receptions 732a, for example, monitoring or detecting a PDCCH for DCI or grant information, during the PDCCH monitoring state 606 (State 2), and the Rx BW may cover the configured CORESET that the UE is monitoring or required to monitor/detect. In some cases, the UE may detect a DL grant in the PDCCH monitoring state 606 and transition to the Data Ready state 604 (State 1). In an example, during the Data Ready state 604 (State 1), the UE may be configured at the full modem operations (e.g., having a full Rx BW) to perform one or more CCH receptions 732b, and then perform one or more DL data receptions 734 in response to the DL grant (e.g., received in the previous or current slot) in one or more slots, for example, during the ON duration and/or before the Timer 1 starts. In an aspect, the UE may continue monitor CCH and perform one or more CCH receptions 732b during the time period of the Timer 1. In some cases, during the DRX cycle 738, when the Timer 1 expires, the UE may exit the Data Ready state 604 (State 1) and enter the PDCCH monitoring state 606 (State 2), until the Timer 2 expires. In some cases, upon the Timer 2 expires, the UE re-enters the DRX or Sleep state 602 (State 0), until the end of the DRX cycle 738.

Figure 7C:
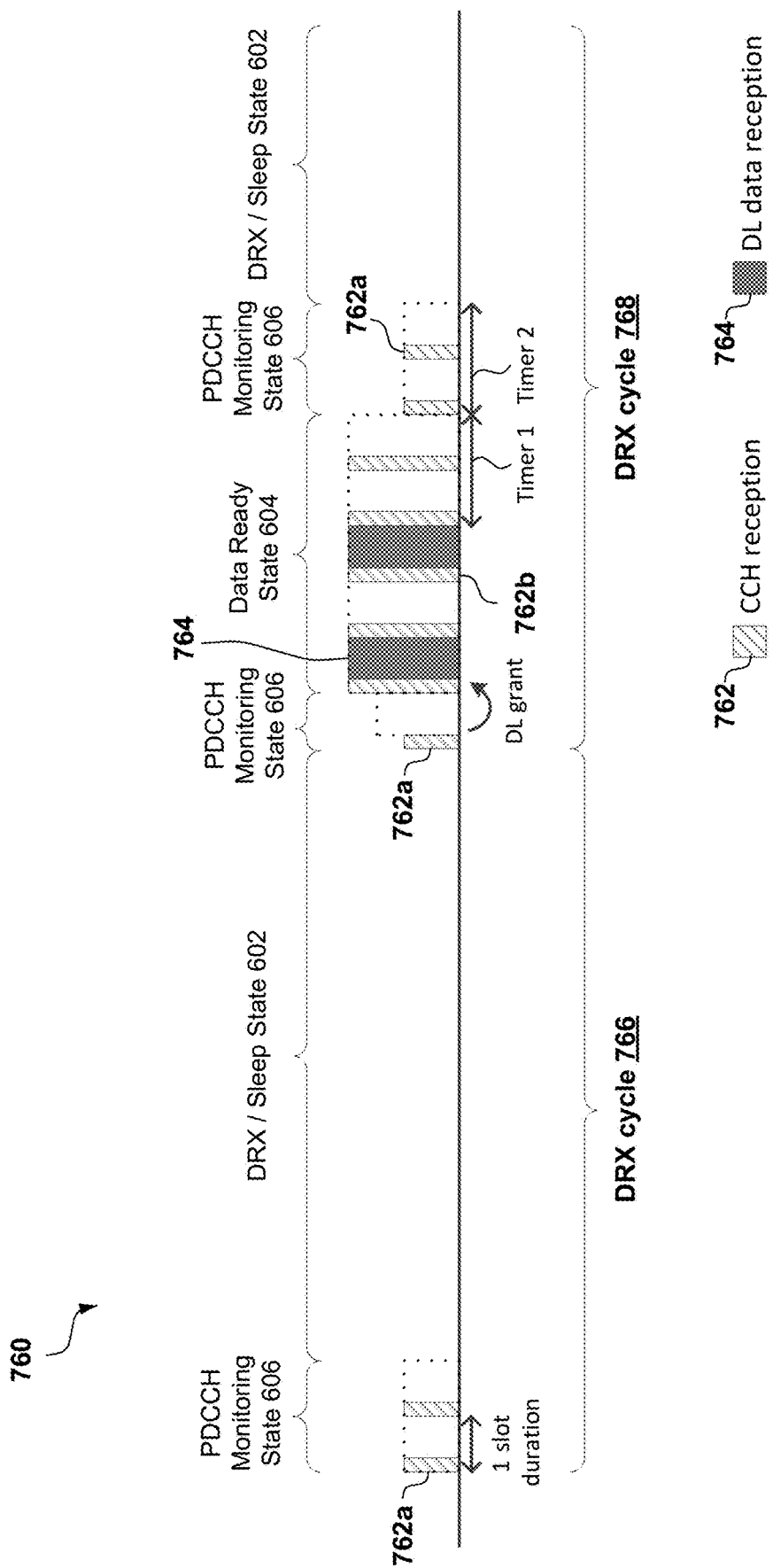
FIG. 7C is a second example of a timeline diagram for a 3-state scheme, according to one or more of the presently described aspects.

Referring to FIG. 7C, in an aspect, a timeline diagram 760 with a 3-state scheme (e.g., the 3-state scheme 650) is shown. Similar to FIG. 7A and FIG. 7B, in FIG. 7C, Y-axis indicates the amount of Rx BW actively in use and is proportional to the power consumption, while the dotted outline illustrates the receiving BW that the RF circuitry may be configured to even if no active reception is taking place. In the timeline diagram 760, the ON duration may be configured to 2, 3, or more slots, the Timer 1 may be configured to 1 slot, and the Timer 2 may be configured to 2 slots.

In an example, a UE (e.g., the UE 12 or UE 14 in FIG. 1) may be configured to operate in one of three states or configurations, for example, the DRX or Sleep state 602 (State 0), the Data Ready state 604 (State 1), or the PDCCH monitoring state 606 (State 2), and perform state transitions among the three states (e.g., using the 3-state scheme 650 in FIG. 6). In a DRX cycle 766, the UE may perform one or more CCH receptions 762a, for example, perform monitoring or detecting PDCCH for DCI or grant information, during the PDCCH monitoring state 606 (State 2). In some cases, the UE may not detect any grant for DL or UL data allocation, and when the Timer 2 expires as discussed in the 3-state scheme 650, the UE may transition from the PDCCH monitoring state 606 to the DRX or Sleep state 602, until the end of the DRX cycle 766.

In a DRX cycle 768, similarly, the UE may perform a CCH reception 762a, for example, monitoring or detecting a PDCCH for DCI or grant information, during the PDCCH monitoring state 606 (State 2), and the Rx BW may cover the configured CORESET that the UE is monitoring or required to monitor/detect. In some cases, the UE may detect a DL grant in the PDCCH monitoring state 606 and transition to the Data Ready state 604 (State 1). In an example, during the Data Ready state 604 (State 1), the UE may be configured at the full modem operations (e.g., having a full Rx BW) to perform one or more CCH receptions 762b, and then perform one or more DL data receptions 764 in response to the DL grant (e.g., received in a previous or current slot) in one or more slots, for example, during the ON duration and/or before the Timer 1 starts. In this example, there is a gap slot between two slots having DL data receptions 764 or data allocation, and during this gap slot the UE is not configured to receive DL data (e.g., no DL grant received in the slot before the gap slot). In an aspect, the UE may continue monitor CCH and perform one or more CCH receptions 762b during the time period of the Timer 1. In some cases, during the DRX cycle 768, when the Timer 1 expires, the UE may exit the Data Ready state 604 (State 1) and enter the PDCCH monitoring state 606 (State 2), until the Timer 2 expires. In some cases, upon the Timer 2 expires (e.g., after 2 slots), the UE may re-enter the DRX or Sleep state 602 (State 0), until the end of the DRX cycle 768.

Figure 8:
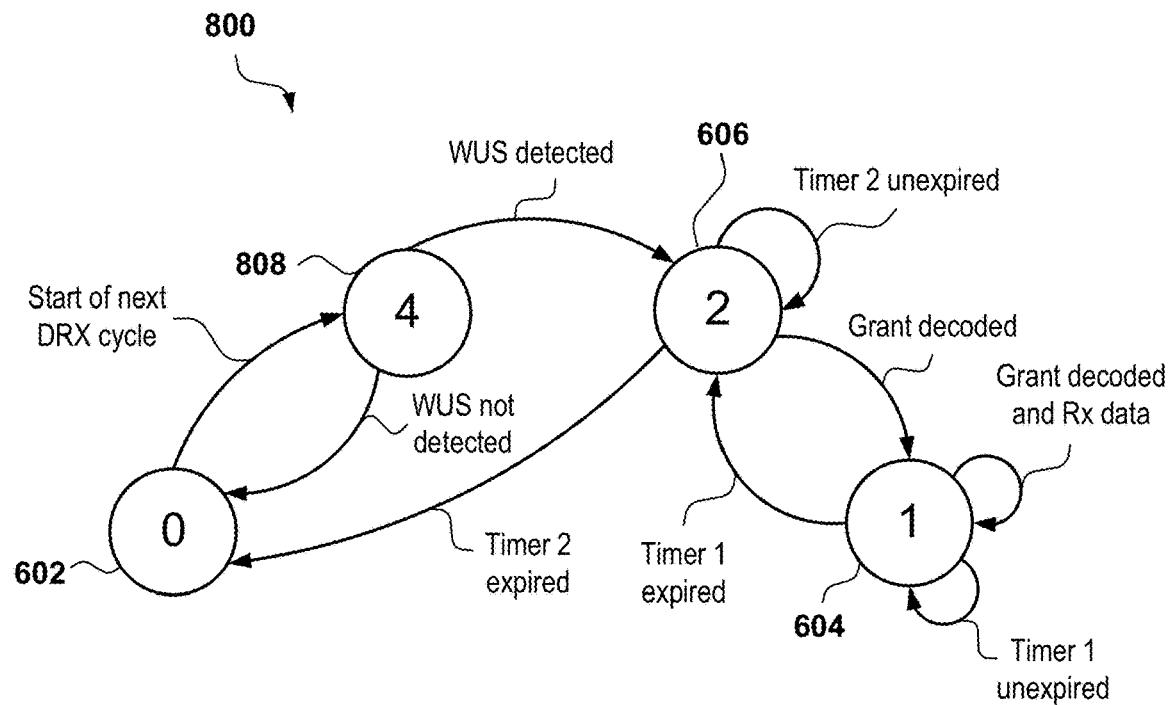
FIG. 8 illustrates two examples of a state diagrams using a 4-state scheme, according to one or more of the presently described aspects.
Figure 8:
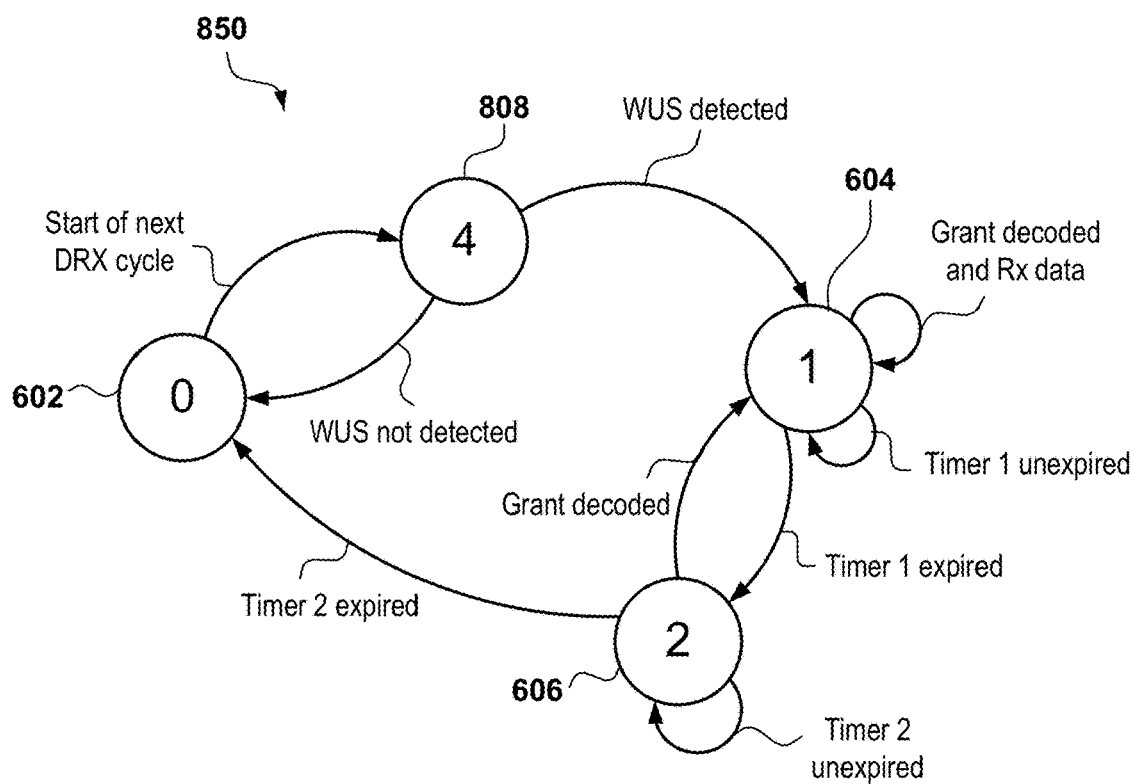

Referring to FIG. 8, in an aspect, state diagrams for a 4-state scheme 800 (e.g., in an LTE system) and a 4-state scheme 850 may be used by a UE (e.g., the UE 12 or UE 14 in FIG. 1) in a wireless communications system (e.g., 5G NR). In some examples, the 4-state scheme 800 may be a 4-state baseline based on a 3-state design (e.g., the 3-state scheme 650), and may include four states or configurations discussed herein. In an aspect, in addition to the DRX or Sleep state 602 (State 0), the Data Ready state 604 (State 1), and the PDCCH monitoring state 606 (State 2), a WUS PWU state 808 (State 4) may be configured or added. For example, the WUS PWU state 808 (State 4) may be configured in between State 0 to State 2, and may be used for transitioning from State 0 to State 2, where the target is for the UE to return to State 0 quickly if WUS is not detected for the current DRX cycle (e.g., to save UE power).

In an aspect, the WUS PWU state (State 4) may be configured to allow UE to skip the entire ON duration for an upcoming DRX cycle, if a base station or gNB scheduler already decides that the base station or gNB may not schedule to the UE. In some examples, the UE at the WUS PWU state (State 4) may monitor configured WUS resource(s) at a PWU offset prior to the start of the upcoming DRX cycle. If WUS is detected, the UE may transition from the WUS PWU state 808 (State 4) to a state (e.g., the Data Ready state 604 (State 1) or the PDCCH monitoring state 606 (State 2)) that monitors for a potential grant. In some cases, in addition to a wake-up indication, the WUS may carry some other information. In an example, the WUS may occupy a small BW footprint, and decoding complexity may be low. In addition, the sleep-wake transition overhead may also be low. In some cases, the WUS channel structure for the WUS PWU state 808 (State 4) may or may not be identical to the WUS used in the WUS monitoring state (State 3) as discussed below.

In an aspect, a 4-state scheme 850 may be a 4-state variant for the 4-state scheme 800. In an example, when WUS is detected, the UE may directly transition from the WUS PWU state 808 (State 4) to the Data Ready state 604 (State 1) instead of the PDCCH monitoring state 606 (State 2), being more efficient if WUS is reliable and false detection rate of WUS is small, and the UE may be able to warm up fully before entering the Data Ready state 604 (State 1). Otherwise the 4-state scheme 850 is very similar to the 4-state baseline design (e.g., 4-state scheme 800).

Regarding the enhancement, WUS may carry an indication for which state to transition to (e.g., State 2 or State 1). Basically, dynamic selection may be performed between the baseline (e.g., the 4-state scheme 800) and the variant scheme (e.g., the 4-state scheme 850). In an implementation, the 4-state scheme 800 or the 4-state scheme 850 may be used for low latency traffic, and the UE may be configured to directly switch to the Data Ready state 604 (State 1). In another example, for more latency-tolerant traffic, stepping through the PDCCH monitoring state 606 (State 2) may be used.

Figure 9A:
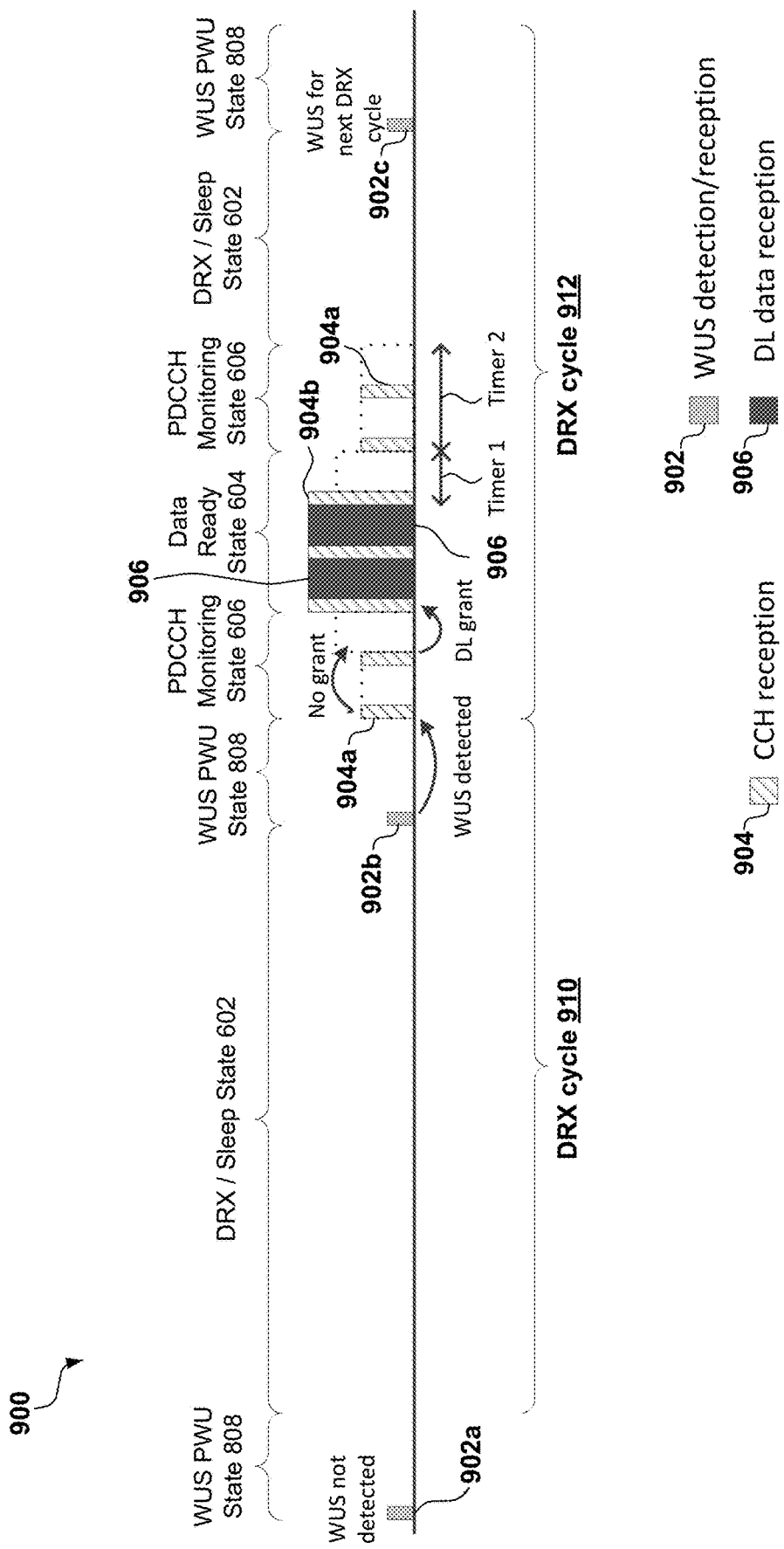
FIG. 9A is a first example of a timeline diagram for a 4-state scheme, according to one or more of the presently described aspects.

Referring to FIG. 9A, in an aspect, a timeline diagram 900 with a 4-state baseline scheme (e.g., the 4-state scheme 800) illustrates the UE operating in two DRX cycles. In the timeline diagram 900, Y-axis indicates the amount of Rx BW actively in use and is proportional to the power consumption, while the dotted outline illustrates the receiving BW that the RF circuitry may be configured to even if no active reception is taking place. In the timeline diagram 900, the Timer 1 is configured to 1 slot, and the Timer 2 is configured to 2 slots.

In an aspect, a UE (e.g., the UE 12 or UE 14 in FIG. 1) may be configured to operate in one of four states or configurations, for example, the DRX or Sleep state 602 (State 0), the Data Ready state 604 (State 1), the PDCCH monitoring state 606 (State 2), or the WUS PWU state 808 (State 4), and perform state transitions among the four states (e.g., using the 4-state scheme 800 or 850 in FIG. 8). In an example, the UE may be configured to operate in a first WUS PWU state 808 (State 4), and if the WUS is not detected during a WUS detection/reception 902 (e.g., a WUS detection 902*a*), the UE may be configured to transition from the first WUS PWU state 808 (State 4) to a first DRX or Sleep state 602 (State 0), until a second WUS PWU state 808 (State 4) is configured and a WUS is detected during a second WUS detection/reception 902 (e.g., a WUS detection 902*b*) in a DRX cycle 910. In another example, the DRX cycle 910 may be aligned with WUS. For instance, the DRX cycle 910 may start from the beginning of WUS detection 902*a* and may end right before WUS detection 902*b*. In some cases, the DRX cycle 910 may cover a time period of the first (or the second) WUS PWU state 808 and the first DRX or Sleep state 602.

In an example, in a second DRX cycle (e.g., a DRX cycle 912), upon the WUS is detected by the UE during the WUS detection 902*b*, the UE may be configured to transition from the second WUS PWU state 808 (State 4) to a first DCCH monitoring state 606 (State 2), and perform one or more CCH receptions 904 (e.g., CCH reception 904*a*), for instance, perform monitoring or detecting PDCCH for DCI or grant information, during the PDCCH monitoring state 606 (State 2). In an aspect, the UE may be configured to operate in an Rx BW that covers the configured CORESET for the UE to monitor or detect CCHs. In some cases, the UE may not detect a grant for DL or UL data allocation in a CCH reception 904*a*. In some other cases, the UE may detect a DL grant in a CCH reception 904*a* during the PDCCH monitoring state 606 (State 2), and then transition to the Data Ready state 604 (State 1) to perform one or more CCH receptions 904*b*, and one or more DL data allocations 906.

In the DRX cycle 912, there may be back-to-back scheduling of data for the UE. For example, the UE may detect a first DL grant in a CCH reception 904*a* during a first slot, and a second DL grant in a CCH reception 904*b* during a second slot (e.g., a consecutive slot of the first slot). In an aspect, during the Data Ready state 604 (State 1), the UE may be configured at the full modem operations (e.g., having a full Rx BW) to perform one or more CCH receptions 904*b*, and one or more DL data receptions 906 (e.g., in response to the DL grants received in the previous or current slot) in one or more slots, for example, during the ON duration of the DRX cycle 912.

In an aspect, during the Data Ready state 604 (State 1), the UE may continue monitor CCH (e.g., perform one or more CCH receptions 904*b*) during the time period of the Timer 1. In some cases, during the DRX cycle 912, when the Timer 1 expires, the UE may exit the Data Ready state 604 (State 1) and enter a second PDCCH monitoring state 606 (State 2) to perform one or more CCH receptions 904*a*, until the Timer 2 expires. In some cases, upon the Timer 2 expires, the UE re-enters the DRX or Sleep state 602 (State 0), and/or a third WUS PWU state 808 (State 4) to monitor WUS for the next DRX cycle of the current DRX cycle 912, for example, to perform a WUS detection 902*c*.

Figure 9B:
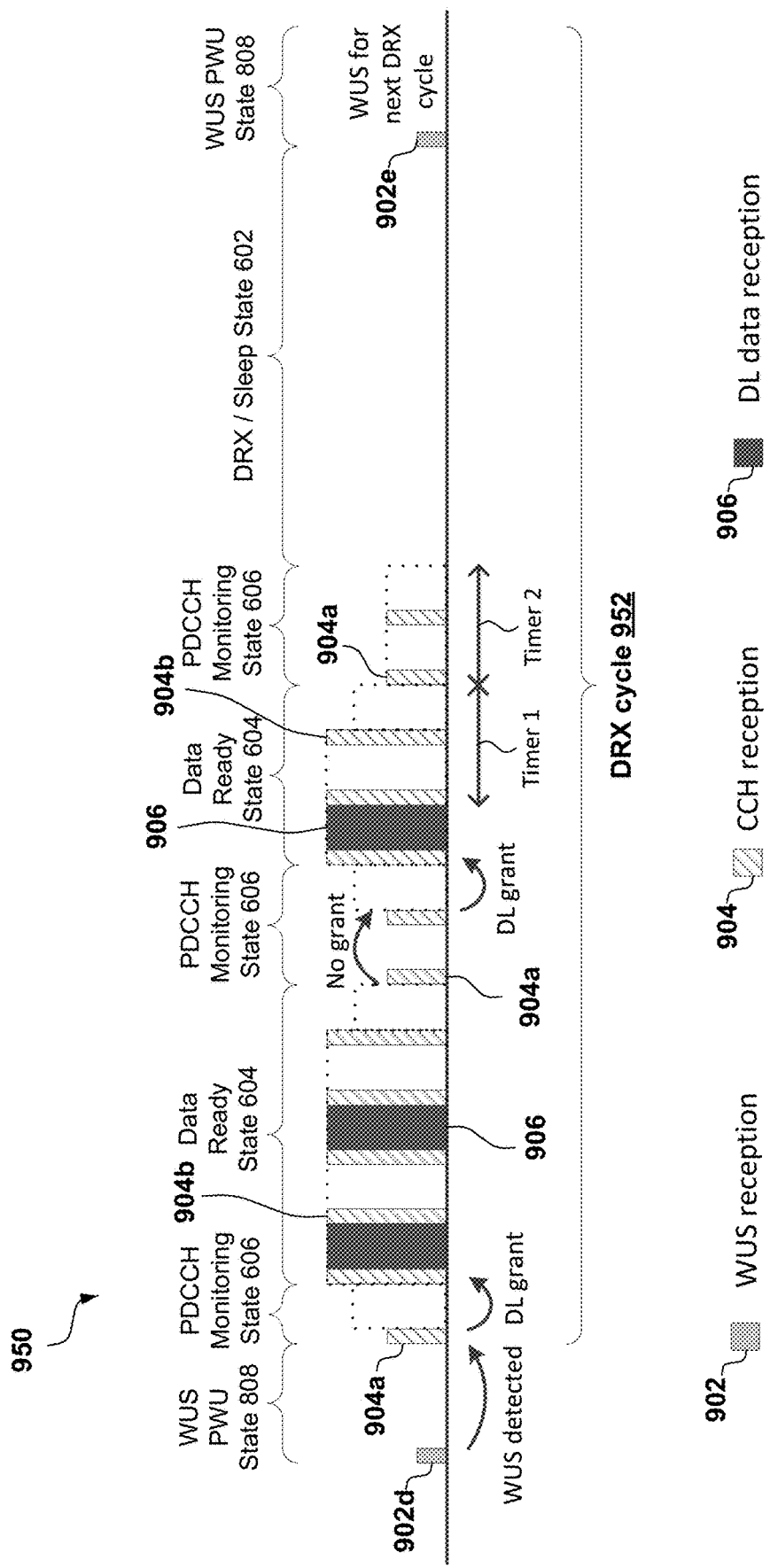
FIG. 9B is a second example of a timeline diagram for a 4-state scheme, according to one or more of the presently described aspects.

Referring to FIG. 9B, in an aspect, a timeline diagram 950 with a 4-state scheme (e.g., the 4-state scheme 800 or 850) illustrates a single DRX cycle with WUS being detected. In an example, a UE (e.g., the UE 12 or UE 14 in FIG. 1) may be configured to operate in the 4-state scheme, which includes four states or configurations, for example, the DRX or Sleep state 602 (State 0), the Data Ready state 604 (State 1), the PDCCH monitoring state 606 (State 2), and the WUS PWU state 808 (State 4). The UE may be configured to perform state transitions among the four states (e.g., using the 4-state scheme 800 or 850 in FIG. 8). In an example, the timeline diagram 950 may not have back-to-back data scheduled for the UE, resulting in more state transitions between the PDCCH monitoring state 606 (State 2) and the Data Ready state 604 (State 1).

In the timeline diagram 950, for example, Y-axis indicates the amount of Rx BW actively in use and is proportional to the power consumption, while the dotted outline illustrates the receiving BW that the RF circuitry may be configured to even if no active reception is taking place. In the timeline diagram 950, both the Timer 1 and the Timer 2 are configured to 2 slot.

In an example of the timeline diagram 950, upon the WUS is detected by the UE during a WUS detection 902*d* at a first WUS PWU state 808 (State 4), the UE may be configured to transition from the second WUS PWU state 808 (State 4) to a first DCCH monitoring state 606 (State 2), and enters a DRX cycle 952. During the first DCCH monitoring state 606 (State 2), the UE may be configured to perform one or more CCH receptions 904 (e.g., a CCH reception 904*a*) to monitor or detect PDCCH for DCI or grant information. In an aspect, the UE may be configured to operate in an Rx BW that covers the configured CORESET for the UE to monitor or detect CCHs. In some cases, the UE may detect a DL grant in the CCH reception 904*a* during the PDCCH monitoring state 606 (State 2), and then transition to the Data Ready state 604 (State 1) to perform one or more CCH receptions 904*b*, and one or more DL data allocations 906, as shown in FIG. 9B.

In some example, after one or more DL data allocations 906, if the UE detects no DL grants for the UE during the Data Ready state 604 (State 1) or the Timer 1 expires, the UE may transition from the Data Ready state 604 (State 1) to the PDCCH monitoring state 606 (State 2). In some cases, if no back-to-back data scheduled for or detected by the UE, the UE may transition between the Data Ready state 604 (State 1) and the PDCCH monitoring state 606 (State 2) multiple times. In some cases, upon the Timer 2 expires, the UE may re-enter the DRX or Sleep state 602 (State 0), followed by a WUS PWU state 808 (State 4) to monitor WUS for the next DRX cycle of the current DRX cycle 952, for example, to perform a WUS detection 902*e*.

Referring to FIG. 10, in an aspect, state diagrams for a 5-state scheme 1000 and a 5-state scheme 1050 may be used by a UE (e.g., the UE 12 or UE 14 in FIG. 1) in a wireless communications system (e.g., 5G NR). In some examples, the 5-state scheme 1000 may be a 5-state baseline based on a 4-state baseline design (e.g., 4-state scheme 800), and a WUS monitoring state 1002 (State 3) may be included or added when the transition is from the PDCCH monitoring state 606 (State 2) to the DRX or Sleep state 602 (State 0).

In an aspect, the WUS monitoring state 1002 (State 3) may be similar to the PDCCH monitoring state 606 (State 2), and may allow lower power consumption compared to the PDCCH monitoring state 606 (State 2). For example, at the WUS monitoring state 1002 (State 3), the UE may monitor configured WUS resources at a configured periodicity (e.g., every slot, or a period larger than a slot). If a WUS is detected by the UE, after a pre-configured delay, the UE may transition from the WUS monitoring state 1002 (State 3) to the PDCCH monitoring state 606 (State 2) for one or more potential grants.

In another aspect, the UE may transition from the WUS monitoring state 1002 (State 3) to the DRX or Sleep state 602 (State 0) if a Timer 3 expires. In some examples, the Timer 3 is a count-down timer initialized with a pre-configured value whenever the WUS monitoring state 1002 (State 3) is entered, and the Timer 3 decrements when no WUS is detected.

In some implementations, the WUS monitoring state 1002 (State 3) may be optional, and the additional power saving on top of the PDCCH monitoring state 606 (State 2) may vary depend on applications. In some cases, if WUS is to be monitored by the UE in every slot, PDCCH having cross-slot grant support and WUS may not be distinctively different, especially when the PDCCH in the PDCCH monitoring state 606 (State 2) is optimized for lower decoding complexity. For example, both PDCCH with cross-slot grant support and WUS may be intended for low power operations. One difference is that WUS may be intended to be monitored for one or a few occasions per DRX cycle, while PDCCH with cross-slot grant may be monitored for longer time (e.g., during the Inactivity Timer is running). In some cases, if WUS is used for monitoring for longer time, WUS and PDCCH with cross-slot grant may not be very distinctively different for power saving.

In another example, a 5-state scheme 1050 may be a 5-state variant based on the 4-state variant scheme (e.g., the 4-state scheme 850), adding the WUS monitoring state 1002 (State 3) on the transition from the PDCCH monitoring state 606 (State 2) to the DRX or Sleep state 602 (State 0). In other words, the WUS monitoring state 1002 (State 3) may be included or added when the transition is from the PDCCH monitoring state 606 (State 2) to the DRX or Sleep state 602 (State 0). In an example, when WUS is detected, the UE may directly transition from the WUS PWU state 808 (State 4) to the Data Ready state 604 (State 1) instead of the PDCCH monitoring state 606 (State 2), being more efficient if WUS is reliable and false detection rate of WUS is small, and the UE may be able to warm up fully before entering the Data Ready state 604 (State 1). Otherwise the 5-state scheme 1050 is very similar to the 5-state scheme 1000.

Figure 11:
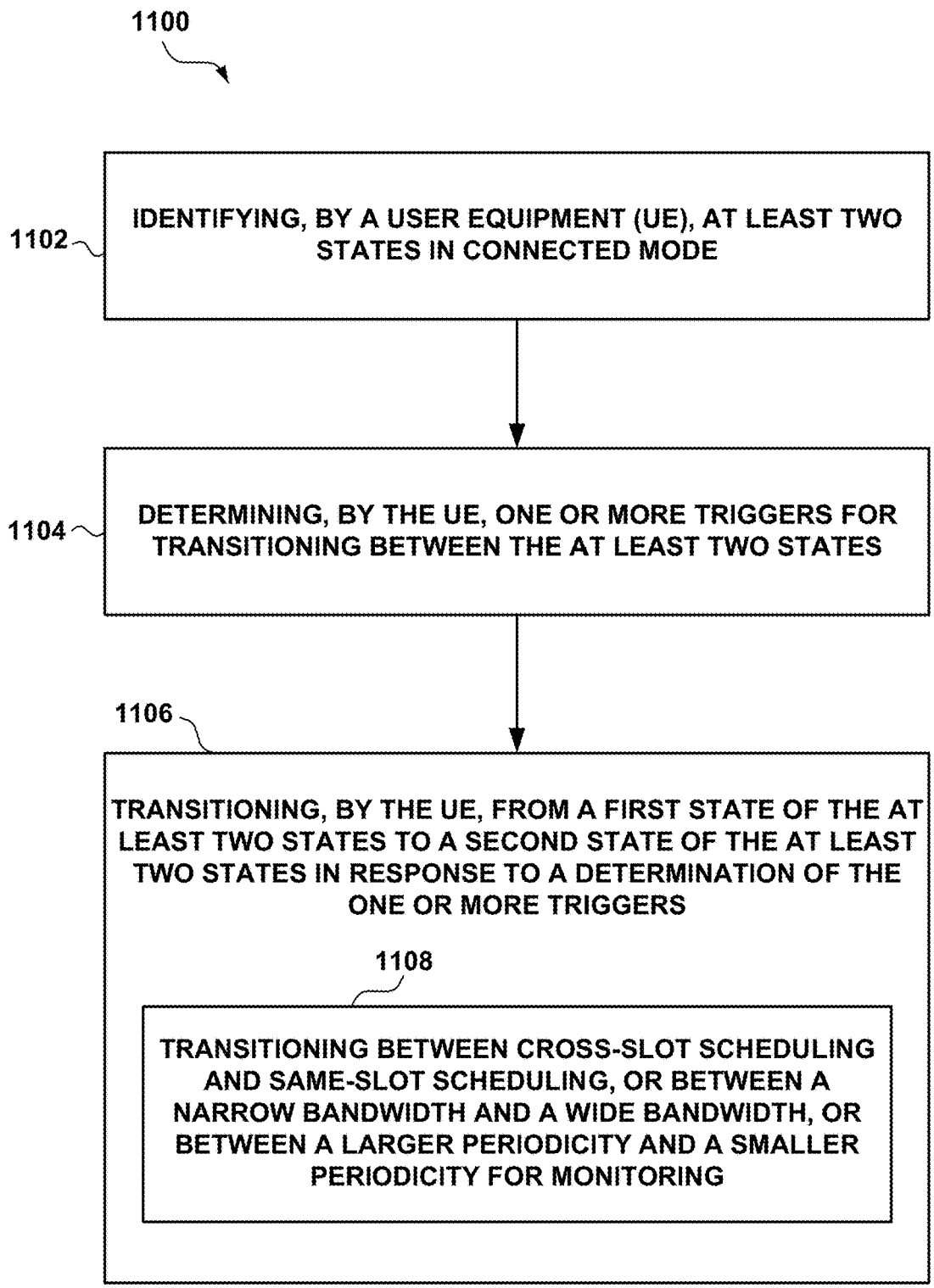
FIG. 11 is a flow chart of an example method of multi-state discontinuous reception (DRX) for wireless communications (e.g., 5G NR), according to one or more of the presently described aspects.

Referring to FIG. 11, in an operational aspect, a UE (e.g., the UE 12 or UE 14 in FIG. 1) may perform one or more aspects of a method 1100 for multi-state DRX operations in a wireless communications system (e.g., a 5G NR system). For example, one or more of the processors 103, the memory 130, the modem 108, the transceiver 106, the C-DRX management component 40, the conditioning component 42, and/or the state transition component 44, may be configured to perform aspects of the method 1100.

In an aspect, at block 1102, the method 1100 may include identifying, by a UE, at least two states in connected mode. In an aspect, for example, the C-DRX management component 40, e.g., in conjunction with one or more of the processors 103, the memory 130, the modem 108, and/or the transceiver 106, may be configured to identify multiple C-DRX states. For example, the multiple (e.g., two or more) C-DRX states may include a sleep state and a data ready state. In some cases, the multiple C-DRX states may also include at least one of a PDCCH monitoring state, a WUS monitoring state, or a WUS pre-wake-up state.

In some examples, one or more states discussed above may comprise a respective configuration for connected mode operation (e.g., C-DRX). In some cases, the configuration may be at least one of cross-slot scheduling, same-slot scheduling, an adaptive bandwidth for signal reception (e.g., using bandwidth parts), low power setting, or high power setting. In some cases, transitioning from one state to another state may comprise dynamically transitioning from one configuration to another configuration for C-DRX operations.

In an aspect, at block 1104, the method 1100 may include determining, by the UE, one or more triggers for transitioning between the at least two states. In an aspect, for example, the C-DRX management component 40, the conditioning component 42, and/or the state transition component 44, e.g., in conjunction with one or more of the processors 103, the memory 130, the modem 108, and/or the transceiver 106, may be configured to determine one or more triggers for transitions between C-DRX states or configurations. In some examples, the one or more triggers are based on UE capabilities for one or more physical channels, one or more latency targets, one or more bandwidths, and/or one or more power levels. In some cases, the C-DRX management component 40 of the UE may be configured to receive, via the transceiver 106, the one or more triggers through at least one of explicit signaling, implicit signaling, or an indication of expiration of a timer.

In an aspect, at block 1106, the method 1100 may include transitioning, by the UE, from a first state of the at least two states to a second state of the at least two states in response to a determination of the one or more triggers. In an aspect, for example, the C-DRX management component 40, the conditioning component 42, and/or the state transition component 44, e.g., in conjunction with one or more of the processors 103, the memory 130, the modem 108, and/or the transceiver 106, may be configured to transition the UE 12 or UE 14 from a first state of the at least two states to a second state of the at least two states in response to a determination of the one or more triggers.

In one implementation, each of the first state and the second state may be one of the at least two states in connected mode. For example, the C-DRX management component 40, e.g., in conjunction with one or more of the processors 103, the memory 130, the modem 108, and/or the transceiver 106, may be configured to identify the multiple C-DRX states including at least two states in connected mode, and the at least two states in connected mode include the first state and the second state that are used for UE state transition at block 1106.

In another aspect of the method 1100, at block 1108, the UE state transition (at block 1106) may comprise transitioning between cross-slot scheduling and same-slot scheduling, or between a narrow bandwidth and a wide bandwidth, or between a larger periodicity and a smaller periodicity for monitoring. In an aspect, for example, the C-DRX management component 40, and/or the state transition component 44, e.g., in conjunction with one or more of the processors 103, the memory 130, the modem 108, and/or the transceiver 106, may be configured to dynamically transition the UE between cross-slot scheduling and same-slot scheduling, or between a narrow bandwidth and a wide bandwidth, or between a larger periodicity and a smaller periodicity for monitoring.

For purposes of simplicity of explanation, the methods discussed herein are shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Several aspects of a telecommunications system have been presented with reference to an LTE/LTE-A or a 5G NR communications system. As those skilled in the art will readily appreciate, various aspects described throughout this disclosure may be extended to other telecommunication systems, network architectures and communication standards.

By way of example, various aspects may be extended to other communication systems such as High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications, comprising:
   identifying, by a user equipment (UE), at least two states in connected mode;
   determining, by the UE, one or more triggers for transitioning between the at least two states; and
   transitioning, by the UE, from a first state of the at least two states to a second state of the at least two states in response to a determination of the one or more triggers, wherein the transitioning comprises transitioning between cross-slot scheduling and same-slot scheduling.

2. The method of claim 1, wherein the at least two states include at least two of a sleep state, a data ready state, a physical downlink control channel (PDCCH) monitoring state, a wake-up signaling (WUS) monitoring state, or a WUS pre-wake-up state.

3. The method of claim 1, wherein the one or more triggers are based on UE capabilities for one or more physical channels, one or more latency targets, one or more bandwidths, and/or one or more power levels.

4. The method of claim 1, wherein each of the at least two states comprises a respective configuration for connected mode discontinuous reception (C-DRX).

5. The method of claim 4, wherein transitioning from the first state to the second state comprises dynamically transitioning from a first configuration for C-DRX to a second configuration for C-DRX.

6. The method of claim 5, wherein each of the first configuration and the second configuration comprises at least one of the cross-slot scheduling, the same-slot scheduling, or an adaptive bandwidth for signal reception.

7. The method of claim 1, wherein the first state is a low power state and the second state is a high power state, and wherein transitioning from the first state to the second state comprises transitioning from the low power state to the high power state.

8. The method of claim 1, wherein the first state is a high power state and the second state is a low power state, and wherein transitioning from the first state to the second state comprises transitioning from the high power state to the low power state.

9. The method of claim 1, further comprising:
receiving, by the UE, at least one of explicit signaling, implicit signaling, or an indication of expiration of a timer,
wherein the determination of the one or more triggers is based on the at least one of the explicit signaling, the implicit signaling, or the indication of expiration of the timer.

10. The method of claim 1, wherein the one or more triggers comprises an indication indicating the at least two states including at least a physical downlink control channel (PDCCH) monitoring state or a wake-up signaling (WUS) monitoring state.

11. The method of claim 1, further comprising:
in response to the at least two states including a physical downlink control channel (PDCCH) monitoring state, monitoring every two or more slots for a PDCCH; or
reducing the periodicity of PDCCH monitoring by aggregating two or more slots.

12. The method of claim 1, wherein a number of the at least two states, or a number of the one or more triggers, or both are configured by a network entity.

13. The method of claim 1, wherein the transitioning further comprises transitioning between a narrow bandwidth and a wide bandwidth, or between a larger periodicity and a smaller periodicity for monitoring.

14. An apparatus for wireless communications, comprising:
a memory configured to store instructions; and
at least one processor communicatively coupled with the memory, wherein the at least one processor is configured to execute the instructions to:
identify at least two states in connected mode;
determine one or more triggers for transitioning between the at least two states; and
transition from a first state of the at least two states to a second state of the at least two states in response to a determination of the one or more triggers,
wherein the transition from the first state to the second state comprises transitioning between cross-slot scheduling and same-slot scheduling.

15. The apparatus of claim 14, wherein the at least two states include at least two of a sleep state, a data ready state, a physical downlink control channel (PDCCH) monitoring state, a wake-up signaling (WUS) monitoring state, or a WUS pre-wake-up state.

16. The apparatus of claim 14, wherein the one or more triggers are based on UE capabilities for one or more physical channels, one or more latency targets, one or more bandwidths, and/or one or more power levels.

17. The apparatus of claim 14, wherein each of the at least two states comprises a respective configuration for connected mode discontinuous reception (C-DRX).

18. The apparatus of claim 17, wherein the at least one processor is configured to execute the instructions to transition from the first state to the second state comprises further instructions to dynamically transition from a first configuration for C-DRX to a second configuration for C-DRX.

19. The apparatus of claim 18, wherein each of the first configuration and the second configuration comprises at least one of the cross-slot scheduling, the same-slot scheduling, or an adaptive bandwidth for signal reception.

20. The apparatus of claim 14, wherein the first state is a low power state and the second state is a high power state.

21. The apparatus of claim 14, wherein the first state is a high power state and the second state is a low power state.

22. The apparatus of claim 14, further comprising:
a receiver communicatively coupled with the memory and the at least one processor, wherein the at least one processor is configured to execute further instructions to:
receive, via the receiver, at least one of explicit signaling, implicit signaling, or an indication of expiration of a timer,
wherein the determination of the one or more triggers is based on the at least one of the explicit signaling, the implicit signaling, or the indication of expiration of the timer.

23. The apparatus of claim 14, wherein the one or more triggers comprises an indication indicating the at least two states including at least a physical downlink control channel (PDCCH) monitoring state or a wake-up signaling (WUS) monitoring state.

24. The apparatus of claim 14, wherein the at least one processor is configured to execute further instructions to:
in response to the at least two states including a physical downlink control channel (PDCCH) monitoring state, monitor every two or more slots for a PDCCH; or
reduce the periodicity of PDCCH monitoring by aggregating two or more slots.

25. The apparatus of claim 14, wherein the transitioning further comprises transitioning between a narrow bandwidth and a wide bandwidth, or between a larger periodicity and a smaller periodicity for monitoring.

26. A non-transitory computer-readable medium storing computer code executable by a processor for wireless communications, comprising:
code for identifying at least two states in connected mode;
code for determining one or more triggers for transitioning between the at least two states; and
code for transitioning from a first state of the at least two states to a second state of the at least two states in response to a determination of the one or more triggers,
wherein the code for transitioning comprises code for transitioning between cross-slot scheduling and same-slot scheduling.

27. The non-transitory computer-readable medium of claim 26, wherein the at least two states include at least two of a sleep state, a data ready state, a physical downlink control channel (PDCCH) monitoring state, a wake-up signaling (WUS) monitoring state, or a WUS pre-wake-up state.

28. The non-transitory computer-readable medium of claim 26, wherein the one or more triggers are based on UE capabilities for one or more physical channels, one or more latency targets, one or more bandwidths, and/or one or more power levels.

29. The non-transitory computer-readable medium of claim 26, wherein each of the at least two states comprises a respective configuration for connected mode discontinuous reception (C-DRX).

30. The non-transitory computer-readable medium of claim 29, wherein the code for transitioning from the first state to the second state comprises code for dynamically transitioning from a first configuration for C-DRX to a second configuration for C-DRX.

31. The non-transitory computer-readable medium of claim 30, wherein each of the first configuration and the second configuration comprises at least one of the cross-slot scheduling, the same-slot scheduling, or an adaptive bandwidth for signal reception.

32. The non-transitory computer-readable medium of claim 26, wherein the transitioning further comprises transitioning between a narrow bandwidth and a wide bandwidth, or between a larger periodicity and a smaller periodicity for monitoring.

33. An apparatus for wireless communications, comprising:
- means for identifying at least two states in connected mode;
- means for determining one or more triggers for transitioning between the at least two states; and
- means for transitioning from a first state of the at least two states to a second state of the at least two states in response to a determination of the one or more triggers,
- wherein the means for transitioning comprises means for transitioning between cross-slot scheduling and same-slot scheduling.

* * * * *